(12) United States Patent
Itoh et al.

(10) Patent No.: US 8,085,931 B2
(45) Date of Patent: Dec. 27, 2011

(54) COMPUTATION METHOD, COMPUTING DEVICE AND COMPUTER PROGRAM

(75) Inventors: Kouichi Itoh, Kawasaki (JP); Kenji Mukaida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1578 days.

(21) Appl. No.: 11/192,138

(22) Filed: Jul. 29, 2005

(65) Prior Publication Data

US 2006/0222175 A1 Oct. 5, 2006

(30) Foreign Application Priority Data

Mar. 30, 2005 (JP) ................................. 2005-099980

(51) Int. Cl.
*H04L 9/28* (2006.01)
(52) U.S. Cl. ........... 380/28; 713/174; 708/491; 708/492
(58) Field of Classification Search .................. 380/28, 380/29, 30
See application file for complete search history.

(56) References Cited

U.S. PATENT DOCUMENTS

| | | | |
|---|---|---|---|
| 5,751,620 A | | 5/1998 | Monier |
| 5,777,916 A | * | 7/1998 | Monier .................. 708/530 |
| 5,982,900 A | * | 11/1999 | Ebihara et al. .................. 380/30 |
| 6,687,727 B2 | * | 2/2004 | Matsui ........................ 708/650 |
| 2003/0031316 A1 | * | 2/2003 | Langston et al. .............. 380/28 |
| 2005/0185791 A1 | * | 8/2005 | Chen et al. ...................... 380/30 |

FOREIGN PATENT DOCUMENTS

| | | |
|---|---|---|
| EP | 0 801 345 A1 | 10/1997 |
| EP | 1 650 727 A1 | 4/2006 |
| JP | 8-263316 | 10/1996 |
| JP | 8-339310 | 12/1996 |
| JP | 11-305995 | 11/1999 |
| WO | 2005/013243 | 2/2005 |

OTHER PUBLICATIONS

European Search Report for European Application No. 05254555.5; mailed Aug. 4, 2006.

* cited by examiner

*Primary Examiner* — Vivek Srivastava
*Assistant Examiner* — Samuel Ambaye
(74) *Attorney, Agent, or Firm* — Staas & Halsey LLP

(57) ABSTRACT

The computing device calculates an equivalence $H_0 \equiv 2^{m*k+1}$ (mod n) relating to a divisor n of $2^{m*k+1}$ (step A), computes an equivalence $H \equiv 2^{E(p, m, k)}$ (mod n) of $2^{E(p, m, k)}$ (mod n) from $H_0$ by an REDC operation (step B), and performs a correction operation by $H = REDC(H, G)_n$ for $g = 2^{k*G(p, m, k)}$ when $2^p > m \times k$ (step C).

10 Claims, 22 Drawing Sheets

FIG. 1

PRIOR ART $input: a = (a_{m-1}, \cdots, a_1, a_0), b = (b_{m-1}, \cdots, b_1, b_0), n = (n_{m-1}, \cdots, n_1, n_0),$
$\qquad nd_0 = -n^{-1} (\mod 2^k)$
$output: y = (y_m, y_{m-1}, \cdots, y_1, y_0),$ $(y_{m-1}, \cdots, y_1, y_0)_w = (0, \cdots, 0, 0)$
$for\ j := 0\ to\ m-1$
$\qquad (t2, t1) := y_0 + a_0 \times b_j$
$\qquad u := t1 \times nd_0 (\mod 2^k)$
$\qquad (t4, t1) := t1 + u \times ud_0$
$\qquad (c1, c0) := t2 + t1$
$\qquad for\ i := 1\ to\ m-1$
$\qquad\qquad (t3, t2, t1) := y_i + (c1, c0) + a_i \times b_j$
$\qquad\qquad (t1, y_i) := t1 + u \times n_i$
$\qquad\qquad (c1, c0) := t4 + (t3, t2)$
$\qquad next\ i$
$\qquad (c1, c0) := (c1, c0) + y_m$
$\qquad y_{m-1} := c0$
$\qquad y_m := c1$
$next\ j$
$if\ (y \geqq n)\ then\ y := y - n$
$return\ y$

FIG. 2

PRIOR ART $input: a, d, n \quad wherein\ 0 \leq a < n, \quad d = \sum_{i=0}^{v-1} 2^i d_i (d_i = 0, 1)$ $output: y = a^d \pmod{n}$ 1:   $y := 1$ 2:   $H = R^2 \pmod{n}$
    *computation of Montgomery conversion parameter*

3:   $a' := REDC(a, H)_n, \; y' := REDC(y, H)_n$      *Montgomery conversion*

4:   *for* $i := 0$ *to* $v - 1$

5:      $if(d_i = 1) y' := REDC(y', a')_n$
    *Montgomery multiplication remainder*

6:      $a' := REDC(a', a')_n$
    *Montgomery multiplication remainder*

7:   *next i*

8:   $y := REDC(y', 1)_n$      *Montgomery inversion*

9:   *return y*

FIG. 3

PRIOR ART $input : x, n$ $output : H = R^2 (\bmod n)$, wherein $R = 2^x (\bmod n)$ 1: $H = R (\bmod n)$
2: $for\ i := 0\ to\ x-1$
3: $H := H + H$
4: $if (H \geqq n) then\ H := H - n$
5: $next\ i$
6: $return\ H$

F I G. 5

P R I O R   A R T

|  | S101 | S102 | S103 | S104 | S105 | S106 | SUM |
|---|---|---|---|---|---|---|---|
| SFT | 0 | q | 0 | q+v | 2q | 0 | 4q + v |
| SUB | 0 | 0 | 1 | 0.5(q+v) | 0 | 0 | 0.5(q+v) + 1 |
| CMP | 0 | 0 | 0 | q+v | 0 | 0 | q+v |
| REDC | 0 | 0 | 0 | 0 | 0 | p | p |

FIG. 7

PRIOR ART

|      | S201 | S202 | S203 | S204      | S205 | S206                            | SUM                             |
|------|------|------|------|-----------|------|---------------------------------|---------------------------------|
| SFT  | 0    | q    | 0    | q+v       | 2q   | 0                               | 4q + v                          |
| SUB  | 0    | 0    | 1    | 0.5(q+v)  | 0    | 0                               | 0.5(q+v)+ 1                     |
| CMP  | 0    | 0    | 0    | q+v       | 0    | 0                               | q+v                             |
| REDC | 0    | 0    | 0    | 0         | 0    | p'−1+W((m×k)/v) (p'−1∼2(p' − 1)) | p'−1+W((m×k)/v) (p'−1∼2(p' − 1)) |

FIG. 9

PRIOR ART

|  | S301 | S302 | S303 | S304 | SUM |
|---|---|---|---|---|---|
| SFT | 0 | k+v | 0 | 0 | k+v |
| SUB | 0 | 0.5(k+v) | 0 | 0 | 0.5(k+v) |
| CMP | 0 | k+v | 0 | 0 | k+v |
| REDC | 0 | 0 | p'' | $0(2^{p''} = (m \times k)/v)$ <br> $1(2^{p''} = (m \times k)/v)$ | $p''(2^{p''} = (m \times k)/v)$ <br> $p''+1(2^{p''} = (m \times k)/v)$ |

FIG. 10

PRIOR ART

| METHOD | STEP | AMOUNT OF COMPUTATION |
|---|---|---|
| CONVENTIONAL METHOD 1 | STEP A1 | $(5.5 \times q + 2.5 \times v + 1) \times LC$ |
| CONVENTIONAL METHOD 2 | STEP A2 | $(5.5 \times q + 2.5 \times v + 1) \times LC$ |
| CONVENTIONAL METHOD 3 | STEP A3 | $(2.5 \times k + 2.5 \times v) \times LC$ |

FIG. 12

$input: a = (a_{m-1}, \cdots, a_1, a_0), b = (b_{m-1}, \cdots, b_1, b_0), n = (n_{m-1}, \cdots, n_1, n_0),$
$\qquad nd_0 = -n^{-1} (\mod 2^k)$
$wherein \quad 0 < a \times b < 2^{m \times k} \times n$
$output: y = (y_m, y_{m-1}, \cdots, y_1, y_0),$ $(y_{m-1}, \cdots, y_1, y_0)_w = (0, \cdots, 0, 0)$
$for\ j := 0\ to\ m-1$
$\quad (t2, t1) := y_0 + a_0 \times b_j$
$\quad u := t1 \times nd_0 (\mod 2^k)$
$\quad (t4, t1) := t1 + u \times ud_0$
$\quad (c1, c0) := t2 + t1$
$\quad for\ i := 1\ to\ m-1$
$\quad\quad (t3, t2, t1) := y_i + (c1, c0) + a_i \times b_j$
$\quad\quad (t1, y_i) := t1 + u \times n_i$
$\quad\quad (c1, c0) := t4 + (t3, t2)$
$\quad next\ i$
$\quad (c1, c0) := (c1, c0) + y_m$
$\quad y_{m-1} := c0$
$\quad y_m := c1$
$next\ j$
$if(y \geq n) then\ y := y - n$
$return\ y$

F I G. 1 3

$input: a, d, n \quad \text{wherein } 0 \leq a < n, \quad d = \sum_{i=0}^{v-1} 2^i d_i (d_i = 0, 1)$ $output: y = a^d \pmod{n}$ 1:    $y := 1$ 2:    $H \equiv R^2 \pmod{n}$
      *computation of Montgomery conversion parameter*

3:    $a' := REDC(a, H)_n, \, y' := REDC(y, H)_n$      *Montgomery conversion*

4:    $for \; i := 0 \; to \; v-1$

5:        $if (d_i = 1) y' := REDC(y', a')_n$
      *Montgomery multiplication remainder*

6:        $a' := REDC(a', a')_n$
      *Montgomery multiplication remainder*

7:    *next i*

8:    $y := REDC(y', 1)_n$                  *Montgomery inversion*

9:    *return y*

FIG. 16

REG1 | 00110111 | 11001011 | 10101101 | 10110011 (=n)

REG2 | 11001000 | 00110100 | 01010010 | 01001101 (=0−n≡2^m×k (mod n))

FIG. 17A REG2 [11001000] [00110100] [01010010] [01001101] ($\equiv 2^{m \times k} \pmod{n}$)

FIG. 17B REG2 [1] [10010000] [01101000] [10100100] [10011010] ($\equiv 2^{m \times k} \pmod{n}$)

FIG. 17C REG2 [1] [00100000] [11010001] [01001001] [00110100] ($\equiv 2^{m \times k} \pmod{n}$)

FIG. 17D REG2 [0] [01000001] [10100010] [10010010] [01101000] ($\equiv 2^{m \times k+1} \pmod{n}$)

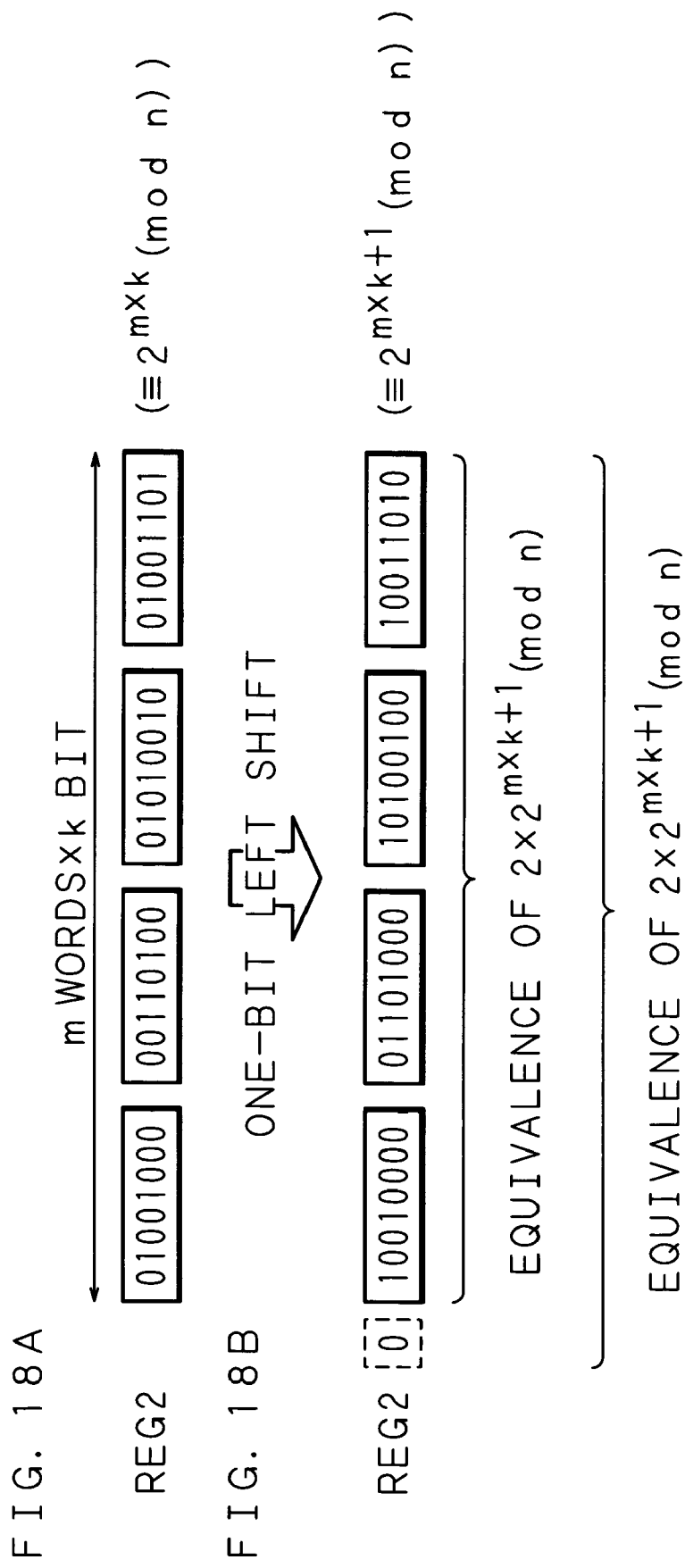

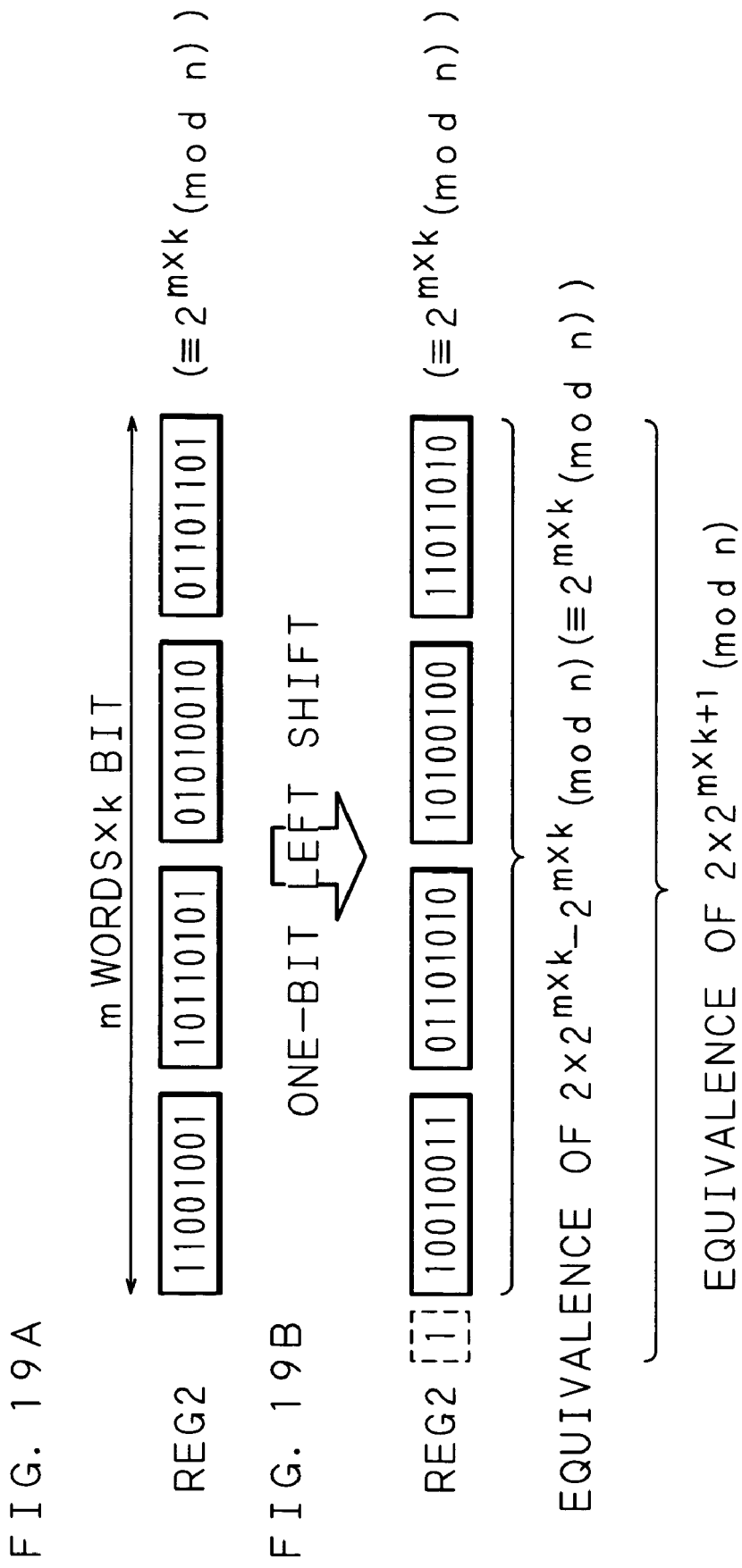

F I G. 2 0

|          | S1 | S2 | S3  | S4 | S5              | SUM               |
|----------|----|----|-----|----|-----------------|-------------------|
| SFT      | 0  | 0  | q+1 | 0  | 0               | q+1               |
| SUB(CPL) | 0  | 1  | 0   | 0  | 0               | 1                 |
| BITCHK   | 0  | 0  | q+1 | 0  | 0               | q+1               |
| REDC     | 0  | 0  | 0   | p  | $0(2^p = m \times k)$ $1(2^p = m \times k)$ | $p(2^p = m \times k)$ $p+1(2^p = m \times k)$ |

F I G. 2 1

|  | LC AND SC (STEP $A_1, A_2, A_3, A$) | REDC (STEP $B_1, B_2, B_3, C_3, B, C$) |
|---|---|---|
| CONVENTIONAL METHOD 1 | $(5.5q + 2.5v + 1) \times LC$ <br> $(q \geqq 0, v \geqq 1)$ | $p(p = \log_2 (m \times k)/v)$ |
| CONVENTIONAL METHOD 2 | $(5.5q + 2.5v + 1) \times LC$ <br> $(q \geqq 0, v \geqq 1)$ | $p'-1 + W((m \times k)/v)$ <br> WHEREIN $p'$ IS BIT LENGTH OF $(m \times k)/v$. <br> $W(x)$ DENOTES NUMBER OF 1 EXCLUDING MOST SIGNIFICANT BIT OF x REPRESENTED AS BIT VALUE. |
| CONVENTIONAL METHOD 3 | $(2.5k + 2.5v) \times LC$ <br> $(k \geqq 8, v \geqq 1)$ | $p''(2^{p''} = (m \times k)/v)$ <br> $p''+1(2^{p''} = (m \times k)/v)$ |
| PRESENT INVENTION | $(q+2) \times LC + (q+1) \times SC$ <br> $(q \geqq 0)$ | $p(2^p = m \times k)$ <br> $p+1(2^p = m \times k)$ |

F I G. 2 2

|  | CONVENTIONAL METHOD 1 | CONVENTIONAL METHOD 2 | CONVENTIONAL METHOD 3 | PRESENT INVENTION |
|---|---|---|---|---|
| EXAMPLE 4 | 13.5×LC | 13.5×LC | 92.5×LC | 11×LC+SC |
| EXAMPLE 5 | 84×LC | 40×LC | 31.5×LC | 15×LC+6×SC |
| EXAMPLE 6 | 18.5×LC | 11.5×LC | 91.5×LC | 10×LC+SC |

COMPUTATION METHOD, COMPUTING DEVICE AND COMPUTER PROGRAM

CROSS-REFERENCE TO RELATED APPLICATIONS

This Nonprovisional application claims priority under 35 U. S. C. §119(a) on Patent Application No. 2005-99980 filed in Japan on Mar. 30, 2005, the entire contents of which are hereby incorporated by reference.

BACKGROUND OF THE INVENTION

1. Field of the Invention

The present invention relates to a computation method for computing a value relating to a Montgomery conversion parameter to be used in a Montgomery multiplication remainder operation, a computing device to which the computation method is applied and a computer program for realizing the computing device and, in particular, to a computation method, a computing device and a computer program for increasing the computational speed.

2. Description of Related Art

It is expected that services which use electronic money or an information network such as the Basic Resident Register Network become widely used with the future development of the information society. An information security technology is indispensable for managing these services safely, and a cryptographic technology is used as a basic technology of information security. By using the cryptographic technology, it is possible to realize functions such as cryptography, digital signature and certification and to protect personal information against unauthorized access from a third party.

A variety of systems have been known until today as a cryptosystem for realizing a cryptographic technology and these systems can be classified broadly into two types of a common key cryptosystem and a public key cryptosystem. What is referred to as a common key cryptosystem is a system which uses the identical key (common key) in encryption and decryption and maintains security by setting, as this common key, information which is unknown to third parties other than the transmitter and the receiver. The public key cryptosystem is a system which uses different keys in encryption and decryption and maintains security by setting, as a key (secret key) for decrypting ciphertext, confidential information owned only by the receiver, instead of making a key (public key) for encryption available to the public. When the common key cryptosystem is used, it is necessary to share the common key mentioned above in a safe manner which is unknown to third parties other than the transmitter and the receiver. On the other hand, the public key cryptosystem has an advantage that it is needless to share confidential information between the transmitter and the receiver but has a disadvantage that the amount of computation for performing processes is extremely large in comparison to the common key cryptosystem. Accordingly, speeding up of a computation process is a major issue in the public key cryptosystem.

Known as representative systems of the public key cryptosystem are RSA cryptography and elliptic curve cryptography. A process using an exponentiation remainder operation is performed in the RSA cryptography while a process using an operation which is referred to as point scalar multiplication is performed in the elliptic curve cryptography. Either of these two operations use, as the basic operation, a multiplication remainder operation represented by an expression $y = a \times b$ (mod n) which uses an integer n that denotes a divisor of a remainder and integers a and b that satisfy $0 \leq a, b < n$.

When the multiplication remainder operation is directly implemented in hardware or software, however, the processing time becomes long and the processing efficiency becomes low. Accordingly, widely used is computing using an operation method which is referred to as a Montgomery multiplication remainder that uses integers a, b and n represented by the following expression, instead of the multiplication remainder operation. By using the Montgomery multiplication remainder operation represented by the following expression, it is possible to realize a quicker process than a normal multiplication remainder operation. It should be noted that the sign "*" in the following expression and the following explanation denotes the multiplication symbol "×".

$$y = a \times b \times R^{-1} \pmod{n}$$

wherein n: integer denoting a divisor of a remainder
a, b: integers which satisfy $0 \leq a, b < n$
R: constant represented by $2^{m*k}$
k: bit length per 1 word
m: the minimum number of words necessary for representing n FIG. 1 is an explanatory view showing the algorithm of a Montgomery multiplication remainder operation. It should be noted that $x = (x_{m-1}, \ldots, x_1, x_0)$ in the algorithm shown in FIG. 1 shows a format for representing an integer x as m word values $x_i$ ($i = _{m-}1, \ldots, 1, 0, 0 \leq x_i < 2^k$). On the basis of a, b and n respectively represented by m word values as shown in FIG. 1, a Montgomery multiplication remainder operation $y = a \times b \times R^{-1}$ (mod n) of a case where a value y represented by m words is calculated is described as $y = REDC(a, b)_n$ or just REDC in the following explanation. Moreover, the sign ":=" in the following drawings including FIG. 1 and the following explanation denotes to assign a numerical value or an expression on the right-hand side to the left-hand side.

As described above, the Montgomery multiplication remainder operation is $a \times b \times R^{-1}$ (mod n) and performs an operation different from a normal multiplication remainder operation $a \times b$ (mod n). Accordingly, in order to execute an exponentiation remainder operation properly, it is necessary to convert input data to be given to the Montgomery multiplication remainder into data which is referred to as Montgomery system. When arbitrary input data to be given to a normal multiplication remainder operation is represented as x, data obtained by converting x into Montgomery system is represented as x', conversion (Montgomery conversion) from x into x' is represented as x'=Mont (x) and conversion (Montgomery inversion) from x' to x is represented as $x = \text{Mont}^{-1}$ (x'), these are given by the following expressions.

Montgomery conversion: $x' = \text{Mont}(x) = x \times R \pmod{n}$

Montgomery inversion: $x = \text{Mont}^{-1}(x') = x' \times R^{-1} \pmod{n}$

The Montgomery conversion and the Montgomery inversion represented by the above expressions can be represented by the following expressions using REDC. Here, H is a value which is referred to as a Montgomery conversion parameter represented as $H = R^2 \pmod{n}$ and is obtained by prior computation.

Montgomery conversion: $x' = REDC(x, H)_n = x \times R^2 \times R^{-1} = x \times R \pmod{n}$ wherein $H = R^2 \pmod{n}$ Montgomery inversion: $x = REDC(x', 1)_n = x' \times 1 \times R^{-1} = x' \times R^{-1} \pmod{n}$ The following description will explain the algorithm of an exponentiation remainder operation which uses a Montgomery multiplication remainder based on the above expressions.

FIG. 2 is an explanatory view showing the algorithm of an exponentiation remainder operation which uses a Montgomery multiplication remainder operation. FIG. 2 shows the algorithm of a Montgomery multiplication remainder operation based on an exponentiation remainder operation which is referred to as a binary method and computes an exponentiation remainder operation result $y=a^d$ (mod n) from the input values a, d and n. The process in the first line in FIG. 2 denotes to give 1 as an initial value of y. The process in the second line denotes to compute a Montgomery conversion parameter $H=R^2$ (mod n). The process in the third line denotes to perform Montgomery conversion for y and a to obtain y' and a'. The loop in the fourth to seventh lines denotes to repeat a process of performing the Montgomery multiplication remainder once or twice according to the bit value of d, from the least significant bit of d to the most significant bit. The process in the eighth line denotes to perform Montgomery inversion for y' computed in the loop in the fourth to seventh lines to obtain a final operation result y.

The following description will explain a computation method of a Montgomery conversion parameter $H=R^2$ (mod n) to be performed in the second line of the algorithm shown in FIG. 2. FIG. 3 is an explanatory view showing the algorithm of a computation method of a Montgomery conversion parameter. The computation method of a Montgomery conversion parameter shown in FIG. 3 is a method for computing $H=R^2$ (mod n) corresponding to a case of $R=2^x$ by repeating addition, comparison and subtraction. The process in the first line denotes to compute H=R (mod n). Although there are a variety of methods for computing H=R (mod n), for example, it is possible to compute simply by R (mod n)=0−n when the significant bit length of n is x for $R=2^x$. The loop in the second to fifth lines computes H+H for H=R (mod n) and then subtracts n when the result is larger than or equal to n, so as to perform an addition remainder (double remainder) of H+H (mod n). It should be noted that computation of H+H may be also realized by a one-bit left shift operation. The algorithm shown in FIG. 3 calculates $R\times 2^x$ (mod n)=$R^2$ (mod n) by repeating the above addition remainder operation x times.

The algorithm of the computation method of a Montgomery conversion parameter shown in FIG. 3, however, has a drawback that the processing speed is low since the addition remainder is repeated x times in the second to fifth lines. For example, in a case of an RSA operation for n of 1024 bit, $R=2^{1024}$, which means that it is necessary to perform an addition remainder operation 1024 times, and the amount of computation becomes enormous, causing lowering of the processing speed.

Therefore, some methods have been proposed to increase the computational speed of a Montgomery conversion parameter $H=R^2$ (mod n), by combining an REDC operation, a shift operation and subtraction. The following description will explain these methods as Conventional Methods 1 to 3. It should be noted that the bit length per 1 word is denoted as k, a value represented by m word values is denoted as n, and the number of successive "0" from the most significant digit of n is denoted as q in the explanation of the following Conventional Method 1 to Conventional Method 3. For example, in a case of k=8, m=2 and q=2 when the bit string of n is "00101011 11001111" while m=3 and q=0 when the bit string of n is "10001001 11100110 11100101".
Conventional Method 1.

FIG. 4 is a flowchart showing a computation method of a Montgomery conversion parameter in Conventional Method 1. In the Conventional Method 1 shown in FIG. 4, a divisor n of a remainder is inputted and $R^2$ (mod n) is outputted. Here, $R=2^{m*k}$ (mod n). The Conventional Method 1 is mainly composed of a step A1 and a step B1. The step A1 is a step of computing $H_0=2^v \times R$ (mod n) using a shift operation and subtraction. Here, v is a natural number. The step B1 is a step of computing $H=R^2$ (mod n) from $H_0$ using an REDC operation.

In the step S101 of the step A1, "n" and "0" are respectively given as initial values to a first register REG1 and a second register REG2. It should be noted that the significant word length of n is m and the number of successive "0" from the most significant bit of the initial value n stored in the first register REG1 in a right-aligned manner is denoted as q. It should be noted that a value stored in the first register REG1 is denoted as REG1 and a value stored in the second register REG2 is denoted as REG2 in the following explanation.

In the step S102 of the step A1, a one-bit left shift operation is repeated q times for the first register REG1 to compute REG1=n'=n×$2^q$.

In the step S103 of the step A1, a value computed by REG2−REG1 is stored in the second register REG2 to give REG2=n'=n×$2^q$.

In the step S104 of the step A1, a one-bit left shift operation for the second register REG2, true/false judgment of REG2≧REG1, and a process of storing the operation result of REG2−REG1 in the second register REG2 when REG2≧REG1 is true are repeated v+q times to give REG2=$2^{m*k+v+q}$. Here, v is an integer which satisfies v≧1 and gives (m×k)/v that is an exponential of 2 for m and k.

In the step S105 of the step A1, a one-bit right shift operation is repeated q times for the first register REG1 and the second register REG2 to compute REG1=n and REG2=$H_0$=$2^{m*k+v}$ (mod n).

In the step S106 of the step B1, a process of storing the result of an REDC operation represented as REDC (REG2, REG2)$_n$ in the second register REG2 is repeated p times to compute REG2=H=$2^{2*m*k}$ (mod n)=$R^2$ (mod n). Here, p is an integer which satisfies p=$\log_2$ ((m×k)/v) and REDC (REG2, REG2)$_n$ represents a Montgomery multiplication remainder operation REDC (A, B)$_n$=$2^{-m*k} \times A \times B$ (mod n).

In the step S107, REG2=$R^2$ (mod n), which is the result of computation, is outputted and the process ends.

FIG. 5 is a chart showing the number of operation times necessary for a computation method of a Montgomery conversion parameter in the Conventional Method 1. FIG. 5 shows the number of operation times necessary for a computation method of the Conventional Method 1 shown using FIG. 4, by type and step of operations. It should be noted that SFT denotes a shift operation of performing one-bit shift, SUB denotes subtraction, CMP denotes a comparison operation and REDC denotes a Montgomery multiplication remainder operation in FIG. 5.

In order to satisfy the condition in the step S106 that p must be an integer which satisfies p=$\log_2$ ((m×k)/v), there is a limitation that (m×k)/v must have a value represented by (m×k)/v=$2^x$ using an integer x, i.e. a value which is an exponential of 2. Since selection of the value of v in the Conventional Method 1 is limited due to this limitation, the value of v needs to be increased depending on the significant bit length of n. As seen from the chart shown in FIG. 5, the total amount of computation is increased by increasing v since the number of computation times of SFT, SUB and CMP depends on v.

Next, an example of the number of operation times of the computation method in the Conventional Method 1 will be described with reference to the chart shown in FIG. 5.

Example 1-1

Application to Computation of RSA Cryptography of 1024 Bit

From the above condition, n is 1024 bit. Assuming that 1 word=32 bit, k=32 and the significant word length of n:

m=32. Since the product k×m of the bit length k per 1 word and the significant word length m of n accords with the total bit of n, the most significant bit of n=1 and q=0. Moreover, since m×k=1024, it is possible to select v=1, 2, 4, . . . , 1024. When v=1, SFT is 4×0+1=1 time, SUB is 0.5×(0+1)+1=1.5 times, CMP is 0+1=1 time and REDC is p=$\log_2$ ((32×32)/1)= 10 times.

Example 1-2

Application to Computation of Elliptic Curve Cryptography of 163 Bit

From the above condition, n is 163 bit. Assuming that 1 word=8 bit, k=8 and the significant word length of n: m=21. Assuming that n has a bit length=8 and a significant word length m=21, the most significant m×k−163=21×8−163=5 bit is 0 and q=5. Moreover, since m×k=168, it is possible to select v=21, 42, 84, 168. When v=21, SFT is 4×5+21=41 times, SUB is 0.5×(5+21)+1=14 times, CMP is 5+21=26 times and REDC is p=$\log_2$ ((21×8)/21)=3 times.

Such a computation method described in the Conventional Method 1 is disclosed in, for example, Japanese Patent Application Laid-Open No. H8-263316 (1996), Japanese Patent Application Laid-Open No. H8-339310 (1996) and Japanese Patent Application Laid-Open No. H11-305995 (1999). Conventional Method 2.

FIG. 6 is a flowchart showing a computation method of a Montgomery conversion parameter in Conventional Method 2. In the Conventional Method 2 shown in FIG. 6, a divisor n of a remainder is inputted and $R^2$ (mod n) is outputted. Here, R=$2^{m*k}$ (mod n). The Conventional Method 2 is mainly composed of a step A2 and a step B2. The step A2 is a step of computing $H_0$=$2^v$×R (mod n) using a shift operation and subtraction in the same process as the process described in the Conventional Method 1, for example. Here, v is a natural number. The step B2 is a step of computing H=$R^2$ (mod n) from $H_0$ using an REDC operation.

In the step S201 of the step A2, "n" and "0" are respectively given as initial values to a first register REG1 and a second register REG2. It should be noted that the significant word length of n is m and the number of successive "0" from the most significant bit of the initial value n stored in the first register REG1 in a right-aligned manner is denoted as q.

In the step S202 of the step A2, a one-bit left shift operation is repeated q times for the first register REG1 to compute REG1=n'=n×$2^q$.

In the step S203 of the step A2, a value computed by REG2−REG1 is stored in the second register REG2 to give REG2=n'=n×$2^q$.

In the step S204 of the step A2, a double remainder operation, which is composed of a one-bit left shift operation for the second register REG2, true/false judgment of REG2≧REG1, and a process of storing the operation result of REG2−REG1 in the second register REG2 when REG2≧REG1 is true, is repeated v+q times to give REG2=$2^{m*k+v+q}$. Here, v is an integer which satisfies v≧1 and gives (m×k)/v that is a natural number for m and k.

In the step S205 of the step A2, a one-bit right shift operation is repeated q times for the first register REG1 and the second register REG2 to compute REG1=n and REG2=$H_0$=$2^{m*k+v}$ (mod n). Then, a value stored in the second register REG 2 is stored in an auxiliary register REG 0.

In the step S206 of the step B2, the result of an REDC operation represented as REDC (REG2, REG2)$_n$ is stored in the second register REG2 and, furthermore, a process of storing the result of the REDC operation represented as REDC (REG2, REG2)$_n$ in the second register REG2 is repeated p'−1 times for i=p'−2, . . . , 1, 0 when i-th bit value of (m×k)=1, to compute REG2=H=$2^{2*m*k}$ (mod n)=$R^2$ (mod n). Here, p' is an integer which denotes the bit length of (m×k)/v and REDC (A, B)$_n$ denotes a Montgomery multiplication remainder operation REDC (A, B)$_n$=$2^{-m*k}$×A×B (mod n).

In the step S207, REG2=$R^2$ (mod n), which is the result of computation, is outputted and the process ends.

FIG. 7 is a chart showing the number of operation times necessary for a computation method of a Montgomery conversion parameter in the Conventional Method 2. FIG. 7 shows the number of operation times necessary for the computation method of the Conventional Method 2 shown using FIG. 6, by type and step of operations. It should be noted that SFT denotes a shift operation of performing one-bit shift, SUB denotes subtraction, CMP denotes a comparison operation and REDC denotes a Montgomery multiplication remainder operation in FIG. 7. Moreover, W(x) denotes the number of 1 excluding the most significant bit of x and is the number of REDC operation times of a case where the bit value of (m×k)/v is 1 in the step S206. For example, W(($10000)_2$)=0 and W(($1000101)_2$)=2. Here, the sign ( . . . )$_2$ denotes a binary number and, for example, ($1101)_2$=13 and ($11100)_2$=28.

Since p' is an integer represented by (m×k)/v as shown in the step S206 and it is possible in the Conventional Method 2 to set the value of v on a wider condition than the Conventional Method 1, it is possible to compute a Montgomery conversion parameter H with amount of computation smaller than the Conventional Method 1 by setting the optimal value of v.

Next, an example of the number of computation times in the Conventional Method 2 will be explained with reference to the chart shown in FIG. 7.

Example 2-1

Application to Computation of RSA Cryptography of 1024 Bit

From the above condition, n is 1024 bit. Assuming that 1 word=32 bit, k=32 and the significant word length of n: m=32. Since the product k×m of the bit length k per 1 word and the significant word length m of n accords with the total bit of n, the most significant bit of n=1 and q=0. Moreover, since m×k=1024, it is possible to select v from 1024 arbitrary factors. When v=1, SFT is 1 time, SUB is 0.5×(1)+1=1.5 times, CMP is 1 time and REDC is p=$\log_2$ ((32×32)/1)=10 times.

Example 2-2

Application to Computation of Elliptic Curve Cryptography of 163 Bit

From the above condition, n is 163 bit. Assuming that 1 word=8 bit, k=8 and the significant word length of n: m=21. Assuming that n has a bit length=8 and a significant word length m=21, the most significant m×k−163=21×8−163=5 bit is 0 and q=5. Moreover, since m×k=168, it is possible to select v from 168 arbitrary factors. When v=21, SFT is 4×5+21=41 times, SUB is 0.5×(5+21)+1=14 times, CMP is 5+21=26 times and REDC is p'−1+W((m×k)/v)=4−1+0=3 times based on (m×k)/v=($1000)_2$.

Such a computation method described in the Conventional Method 2 is disclosed in, for example, U.S. Pat. No. 5,777, 916.

Conventional Method 3.

FIG. 8 is a flowchart showing a computation method of a Montgomery conversion parameter in Conventional Method 3. In the Conventional Method 3 shown in FIG. 8, a divisor n of a remainder is inputted and $R^2$ (mod n) is outputted. Here, $R=2^{m*k}$ (mod n). The Conventional Method 3 is mainly composed of a step A3, a step B3 and a step C3. The step A3 is a step of computing $H_0$ which satisfies $H_0=2^{m*k+v}$ using a shift operation and subtraction. Here, v is a natural number and satisfies that (m×k)/v is a natural number. The step B3 is a step of computing $H=2^{E(p'', m, k)}$ (mod n) from $H_0$ using an REDC operation. Here, p″ is an integer which satisfies $2^{p''-1} < (m \times k)/v \leq 2^{p''}$, and $E(p'', m, k)=m \times k+v \times 2^{p''}$. The step C3 is a step of performing a correction operation by $H=REDC(H, G)_n$ for $g=2^{k*G(p'', m, k)}$ when $2^{p''}>(m \times k)/v$. Here, G is represented by $G(p'', m, k)=2 \times m-(v \times 2^{p''})/k$ and is an integer which satisfies the range of $1 \leq G(p'', m, k) \leq m-1$.

In the step S301 of the step A3, "n" and "$2^{(m-1)*k}$" are respectively given as initial values to a first register REG1 and a second register REG2. It should be noted that the significant word length of n is m.

In the step S302 of the step A3, a double remainder operation, which is composed of a one-bit left shift process for the second register REG2, true/false judgment of REG2≧REG1, and a process of storing the operation result of REG2−REG1 in the second register REG2 when REG2≧REG1 is true, is repeated k+v times to give REG2=$H_0=2^{m*k+v}$ (mod n). Here, v is a natural number and (m×k)/v is an integer.

In the step S303 of the step B3, a process of storing the result of an REDC operation represented as REDC (REG2, REG2)$_n$ in the second register REG2 is repeated p″ times for i=1, 2, . . . , p″ to compute REG2=$2^{E(p'', m, k)}$ (mod n). Here, p″ is an integer which satisfies $2^{p''-1}<(m \times k)/v \leq 2^{p''}$, E(p″, m, k)=m×k+v×$2^{p''}$ and REDC (A, B)$_n$ denotes a Montgomery multiplication remainder operation REDC (A, B)$_n=2^{-m*k} \times A \times B$ (mod n).

In the step S304 of the step C3, the result of an REDC operation represented as REDC (REG2, g)$_n$ is stored in the second register REG2 when $2^{p''}>(m \times k)/v$. Here, $g=2^{k*G(p'', m, k)}$ and G(p″, m, k)=2×m−(v×$2^{p''}$)/k.

In the step S305, REG2=$R^2$ (mod n), which is the result of computation, is outputted and the process ends.

FIG. 9 is a chart showing the number of operation times necessary for a computation method of a Montgomery conversion parameter in the Conventional Method 3. FIG. 9 shows the number of operation times necessary for the computation method of the Conventional Method 3 shown using FIG. 8, by type and step of operations. It should be noted that SFT denotes a shift operation of performing one-bit shift, SUB denotes subtraction, CMP denotes a comparison operation and REDC denotes a Montgomery multiplication remainder operation in FIG. 9.

As shown in the step A3, the value of q is not used to compute $H_0$ in the Conventional Method 3. Moreover, by adding the correction operation process shown in the step S304 to the step S303, there is no longer the limitation that (m×k)/v must have an exponentiation value of 2, and v only has to match the condition shown in the step S302. Furthermore, it is needless to detect each bit value of (m×k)/v.

Next, an example of the number of computation times in the Conventional Method 3 will be explained with reference to the chart shown in FIG. 9.

Example 3-1

Application to Computation of RSA Cryptography of 1024 Bit

From the above condition, n is 1024 bit. Assuming that 1 word=32 bit, k=32 and the significant word length of n: m=32. Since m×k=1024, it is possible to select v from 1024 arbitrary factors. When v=1, SFT is 32+1=33 times, SUB is 0.5×(32+1)=16.5 times, CMP is 32+1=33 times and REDC is p=$\log_2$((32×32)/1)=10 times.

Example 3-2

Application to Computation of Elliptic Curve Cryptography of 163 Bit

From the above condition, n is 163 bit. Assuming that 1 word=8 bit, k=8 and the significant word length of n: m=21. Since m×k=168, it is possible to select v from 168 arbitrary factors. When v=21, SFT is 8+21=29 times, SUB is 0.5×(8+21)=14.5 times, CMP is 8+21=29 times and REDC is p′−1+W((m×k)/v)=4−1+0=3 times based on (m×k)/v=$(1000)_2$.

Such a computation method described in the Conventional Method 3 is disclosed in, for example, PCT International Publication No. 2005/013243.

The above Conventional Method 1 to Conventional Method 3, however, have problems to be solved as described below.

Problem 1.

Since the process of the step A1 in the computation method described as the Conventional Method 1 uses the number of successive "0" from the upper bit in the bit string of "n" stored in the first register REG1 as a parameter q necessary for the following computation, it is necessary to compute the most significant bit (which will be hereinafter referred to as MSB) of a data value. There is a problem that it is necessary to perform a bit-oriented operation process, which has a low processing efficiency in software implementation, in order to compute the MSB. Furthermore, since the number of shift operation times, subtraction times and comparison operation times depends on the value of q as is clear from the chart shown in FIG. 5, there is a problem that the processing load increases as q is larger. As just described, there is a problem of increase in the processing load relating to q.

Problem 2.

Furthermore, the computation method described as the Conventional Method 1 is designed to repeat, in the process of the step B1, an REDC operation p times to compute H=$2^{2*m*k}$ (mod n)=$R^2$ (mod n). Here, p is limited to an integer which satisfies p=$\log_2$((m×k)/v), i.e. a value which gives (m×k)/v that has a value of an exponential of 2. In order to satisfy this limitation, m, k and v are decided in the procedure of deciding m and k from the bit length of n and the bit length per 1 word and setting the value of v so that (m×k)/v has a value of an exponential of 2 for the decided m and k. That is, v might have a large value due to the limitation that the value of v must be set so that (m×k)/v has a value of an exponential of 2. As is clear from the chart shown in FIG. 5, the number of shift operation times, subtraction times and comparison operation times depends on the value of v and there is a problem that the processing load increases as v is larger. As just described, there is a problem of increase in the processing load relating to the limitation that (m×k)/v must have a value of an exponential of 2.

Problem 3.

The computation method described as the Conventional Method 2, which includes the process of the step A2 that is the same as the process of the step A1 of the Conventional Method 1, has a problem of increase in the processing load relating to q similarly as the Conventional Method 1.

Problem 4.

Furthermore, since an REDC operation is repeated p′−1 times in the process of the step B2 and the computation method described as the Conventional Method 2 detects the i-th bit value of (m×k), there is a problem that it is necessary to perform a bit-oriented operation process which has a low processing efficiency in software implementation. As just described, there is a problem relating to detection of each bit value of (m×k)/v due to repetition of an REDC operation. Problem 5.

The computation method described as the Conventional Method 3 is superior in that there is no process which depends on the value of q and computation of MSB described in the Conventional Method 1 and Conventional Method 2. However, since the double remainder operation is repeated k+v times in the process of the step A3, the number of shift operation times, subtraction times and comparison operation times depends on the value of k as is clear from the chart shown in FIG. 9 and the processing load increases as k is larger.

FIG. 10 is a chart showing the number of operation times necessary for a computation method of a Montgomery conversion parameter in conventional methods. FIG. 10 shows the amount of computation of the step A1 in the Conventional Method 1 shown in FIG. 5, the amount of computation of the step A2 in the Conventional Method 2 shown in FIG. 7 and the amount of computation of the step A3 in the Conventional Method 3 shown in FIG. 8. It should be noted that the processing load necessary for operations of a shift operation SFT, subtraction SUB and a comparison operation CMP is regarded as identical so as to facilitate comparison of processing load in the respective computation methods, and these are shown replaced with a constant LC.

The chart in FIG. 10 shows that the computation method described in the Conventional Method 3 has a smaller amount of computation than the Conventional Method 1 and Conventional Method 2 and is an efficient method when (2.5×k+2.5×v)×LC<(5.5×q+2.5×v+1)×LC is satisfied, that is, when (5×k−2)/11<q is satisfied. The computation method described in the Conventional Method 3, however, has a larger amount of computation than the Conventional Method 1 and Conventional Method 2 and turns out to be an inefficient method when the value of q is small and (5×k−2)/11>q is satisfied, that is, when q is small.

In RSA cryptography, for example, the bit length of n of an exponential of 2 such as 2048, 1024 or 512 is commonly used as the value of q actually, and q=0 in such a case. Although the bit length of n takes an arbitrary value when elliptic curve cryptography is used, a bit length of a multiple number of 32 such as 160, 192 or 224 is recommended in a standard specified as SEC1 in SECG (Standards for Efficient Cryptography Group), and q=0 in a case where any of these parameters is used.

Accordingly, from a practical standpoint, the computation method described in the Conventional Method 3 is not always superior to the Conventional Method 1 and Conventional Method 2, and there is a problem that the process of the step A3 has a larger processing load than the process of the steps A1 and A2 when the value of q is small.

BRIEF SUMMARY OF THE INVENTION

The present invention has been made with the aim of solving the above problems, and it is an object thereof to provide a computation method, a computing device to which the computation method is applied and a computer program for realizing the computing device, which can solve the problems in the Conventional Method 1 to Conventional Method 3 by: obtaining a negative number of n as an equivalence relating to a divisor n of $2^{m*k}$ and storing the negative number in a register; repeating a process of performing one-bit shift of a value stored in the register in a carry direction and discarding the most significant bit which overflows the register until the most significant bit to be discarded becomes 0 to obtain an equivalence relating to a divisor n of $2^{m*k+1}$ and storing the equivalence in the register; and computing an equivalence which gives the same remainder value relating to a divisor n as a Montgomery conversion parameter by a Montgomery multiplication remainder operation based on a value stored in the register.

A computation method according to the first aspect is a computation method for computing a value relating to a Montgomery conversion parameter, which is used in a Montgomery multiplication remainder operation and is a remainder value relating to a divisor n of a remainder, using a register, which has at least m words that have a bit length k per 1 word, characterized by including the steps of obtaining a negative number of n as an equivalence relating to a divisor n of $2^{m*k}$ and storing the negative number in the register; repeating a process of performing one-bit shift of a value stored in the register in a carry direction and discarding the most significant bit which overflows the register until the most significant bit to be discarded becomes 0 to obtain an equivalence relating to a divisor n of $2^{m*k+1}$ and storing the equivalence in the register; and computing an equivalence which gives the same remainder value relating to a divisor n as a Montgomery conversion parameter by a Montgomery multiplication remainder operation based on a value stored in the register.

A computation method according to the second aspect is the computation method according to the first aspect, characterized in that an exponentiation remainder operation is executed using the computed equivalence.

A computing device according to the third aspect is a computing device for computing a value relating to a Montgomery conversion parameter, which is used in a Montgomery multiplication remainder operation and is a remainder value relating to a divisor n of a remainder, characterized by comprising: a register; means for storing a negative number of a divisor n of a remainder in the register; means for repeating a process of performing one-bit shift of a value stored in the register in a carry direction until the most significant bit which overflows the register becomes 0; and means for computing an equivalence which gives the same remainder value relating to a divisor n as a Montgomery conversion parameter by a Montgomery multiplication remainder operation based on a value stored in the register.

A computing device according to the fourth aspect is a computing device for computing a value relating to a Montgomery conversion parameter, which is used in a Montgomery multiplication remainder operation and is a remainder value relating to a divisor n of a remainder, characterized by comprising: a register which has at least m words that have a bit length k per 1 word; operation means for executing a Montgomery multiplication remainder operation REDC (A, B)$_n$, which is defined as $2^{-m*k} \times A \times B$ (mod n), for values A and B and a divisor n of a remainder having a significant word length m; means for storing a negative number of a divisor n of a remainder in the register; means for repeating a shift process of performing one-bit shift of a value stored in the register in a carry direction until the most significant bit which overflows the register becomes 0; means for repeating a process of executing a Montgomery multiplication remainder operation REDC (REG, REG)$_n$ for a value REG stored in the register by the operation means and storing a result thereof in the register, p times which p is an integer that satisfies $2^{p-1}<m\times k\leq2^p$; means for executing a Montgomery multiplication remainder operation REDC (REG, g)$_n$ for a value REG stored in the register by the operation means and storing a result thereof in the register when $2^p$>m×k (here, g=$2^{k*G(p, m, k)}$ and G(p, m, k)=2×m−$2^p$/k); and means for outputting a value stored in the register as an equivalence which gives the same remainder value relating to a divisor n as a Montgomery conversion parameter.

A computing device according to the fifth aspect is the computing device according to the fourth aspect, characterized by further comprising: a plurality of registers; means for storing n in a first register which has m words and 0 in a second register which has m or more words; and means for subtracting a value stored in the first register from a value stored in the second register to compute a negative number of a divisor n of a remainder.

A computing device according to the sixth aspect is the computing device according to the fourth aspect, characterized by further comprising: means for storing a divisor n of a remainder in the register; and means for computing a complement of a value stored in the register as a negative number of a divisor n of a remainder.

A computing device according to the seventh aspect is the computing device according to the fourth aspect, characterized by further comprising: means for storing a divisor n of a remainder in the register; means for inverting a value stored in the register; and means for computing a negative number of a divisor n of a remainder assuming that the least significant bit of a value stored in the register is 1.

A computing device according to the eighth aspect is the computing device according to any one of the fourth aspect to the seventh aspect, characterized in that the shift process is an addition process of adding a value stored in the register to said value and the most significant bit which overflows the register in the shift process is detected as a carry value which is generated by the addition process.

A computer program according to the ninth aspect is a computer program for causing a computer, which comprises a register that has at least m words having a bit length k per 1 word, to compute a value relating to a Montgomery conversion parameter, which is used in a Montgomery multiplication remainder operation and is a remainder value relating to a divisor n of a remainder, characterized by causing the computer to execute the procedures of obtaining a negative number of n as an equivalence relating to a divisor n of 2m*k and storing the negative number in the register; repeating a process of performing one-bit shift of a value stored in the register in a carry direction and discarding the most significant bit which overflows the register until the most significant bit to be discarded becomes 0 to obtain an equivalence relating to a divisor n of $2^{m*k+1}$ and storing the equivalence in the register; and computing an equivalence which gives the same remainder value relating to a divisor n as a Montgomery conversion parameter by a Montgomery multiplication remainder operation based on a value stored in the register.

In the first aspect, the third aspect, the fourth aspect and the ninth aspect, an equivalence which gives the same remainder value relating to a divisor n is computed as a value relating to a Montgomery conversion parameter which is used in a Montgomery multiplication remainder operation and is a remainder value relating to a divisor n of a remainder. Although there is a limitation that the remainder value must be larger than or equal to 0 and smaller than a divisor n, there is no limitation on the equivalence. Accordingly, by computing not the remainder value but the equivalence, the limitation is loosened and a variety of processes based on limitation become unnecessary, and it is therefore possible to speed up the computation process. Furthermore, by giving an equivalence as the computation result, a loosely limited equivalence can be used in addition to a tightly limited remainder value also for intermediate data which is generated in process of computation and it is therefore possible to speed up the computation process.

In the above step A1 of the Conventional Method 1 and the step A2 of the Conventional Method 2, for example, in which computation is performed while adjusting the value of REG2 so as to be kept smaller than n', there are problems posed as Problem 1 and Problem 3 since a shift operation must be performed the number of times which depends on q. Moreover, in the above step A3 of the Conventional Method 3, in which computation is performed while adjusting the value of REG2 so as to be kept smaller than n, there is a problem posed as Problem 5. These problems described as Problem 1, Problem 3 and Problem 5 are caused by calculation of a value having a remainder value which is larger than or equal to 0 and smaller than a divisor n, and it is possible with the present invention to solve these problems and speed up the computation process by computing not a remainder value but an equivalence of the remainder value.

It should be noted that a process of repeating a process of performing one-bit shift of a value stored in the register in a carry direction and discarding the most significant bit which overflows the register until the most significant bit to be discarded becomes 0 is performed in the present invention. A process of repeating a shift operation and a process of judging the value of 1 bit to be discarded has a higher operation efficiency than a method for repeating a shift operation and a comparison operation performed in the step S104 of the Conventional Method 1, the step S204 of the Conventional Method 2 and the step S302 of the Conventional Method 3. This is because judgment of a value of 1 bit, which includes only an operation of 1 bit, can perform a quicker process than a multi-bit operation while the shift operation and the comparison operation execute a multi-bit operation for data having an extremely long bit length of 160-2048 bit to be used in an operation performed by a public key cryptosystem. An efficient process using only judgment of 1 bit can be realized because the present invention has thrown off a variety of limitations by not limiting an object of computation to a remainder value and extending the same to an equivalence.

Moreover, in the present invention, it is possible to solve a problem posed as Problem 2 of the Conventional Method 1 since there is no limitation that (m×k)/v must have a value of an exponential of 2.

Furthermore, in the present invention, it is possible to solve a problem posed as Problem 4 of the Conventional Method 2 since an REDC operation is repeated p'−1 times and a process of detecting the i-th bit value of (m×k) is not performed.

In the second aspect, since the exponentiation remainder operation can be also executed using an equivalence, it is possible to enhance the total processing speed by executing the process using an equivalence which gives a high processing efficiency as described above.

In the fifth aspect to the eighth aspect, since an existing arithmetic chip can be used, implementation is easy.

A computation method, a computing device and a computer program according to the present invention, to compute a value relating to a Montgomery conversion parameter, which is used in a Montgomery multiplication remainder operation and is a remainder value relating to a divisor n of a remainder, using a register, which has at least m words that have a bit length k per 1 word, obtain a negative number of n as an equivalence relating to a divisor n of $2^{m*k}$ and store the negative number in the register, repeat a process of performing one-bit shift of a value stored in the register in a carry direction and discarding the most significant bit which overflows the register until the most significant bit to be discarded becomes 0 to obtain an equivalence relating to a divisor n of $2^{m*k+1}$ and store the equivalence in the register, and compute an equivalence which gives the same remainder value relating to a divisor n as a Montgomery conversion parameter by a Montgomery multiplication remainder operation based on a value stored in the register.

Although there is a limitation that a remainder value used in conventional methods must be larger than or equal to 0 and smaller than a divisor n, there is no limitation on an equivalence used in the present invention. Accordingly, since the limitation is loosened by computing not a remainder value but an equivalence, it becomes needless to perform a variety of processes based on limitation and superior effect can be provided such as speeding up of the computation process. Furthermore, since a loosely limited equivalence can be used in addition to a tightly limited remainder value also for intermediate data which is generated in process of computation by giving an equivalence as the computation result, superior effect can be provided such as speeding up of the computation process.

Moreover, in the present invention, since the exponentiation remainder operation can be executed using an equivalence which has a high processing efficiency as described above, superior effect can be provided such as enhancement of the total processing speed. Furthermore, since the present invention can be applied to a public key cryptosystem using a cryptosystem such as RSA cryptography or elliptic curve cryptography, superior effect can be provided such as provision of an information security technology for realizing quick and highly confidential communication.

The above and further objects and features of the invention will more fully be apparent from the following detailed description with accompanying drawings.

BRIEF DESCRIPTION OF THE SEVERAL VIEWS OF THE DRAWINGS

FIG. 1 is an explanatory view showing the algorithm of a Montgomery multiplication remainder operation;

FIG. 2 is an explanatory view showing the algorithm of an exponentiation remainder operation which uses a Montgomery multiplication remainder operation;

FIG. 3 is an explanatory view showing the algorithm of a computation method of a Montgomery conversion parameter;

FIG. 5 is a chart showing the number of operation times necessary for a computation method of a Montgomery conversion parameter in the Conventional Method 1;

FIG. 7 is a chart showing the number of operation times necessary for a computation method of a Montgomery conversion parameter in the Conventional Method 2;

FIG. 9 is a chart showing the number of operation times necessary for a computation method of a Montgomery conversion parameter in the Conventional Method 3;

FIG. 10 is a chart showing the number of operation times necessary for a computation method of a Montgomery conversion parameter in conventional methods;

FIG. 12 is an explanatory view showing the algorithm of a Montgomery multiplication remainder operation relating to a computation method of the present invention;

FIG. 13 is an explanatory view showing the algorithm of an exponentiation remainder operation which uses a Montgomery multiplication remainder operation relating to a computation method of the present invention;

FIG. 16 is an explanatory view schematically showing values to be stored in a first register and a second register comprised in a computing device of the present invention;

FIGS. 17A through 17D are explanatory views schematically showing values to be stored in a second register comprised in a computing device of the present invention;

FIGS. 18A and 18B are explanatory views schematically showing values to be stored in a second register comprised in a computing device of the present invention;

FIGS. 19A and 19B are explanatory views schematically showing values to be stored in a second register comprised in a computing device of the present invention;

FIG. 20 is a chart showing the number of operation times necessary for a computation method of a Montgomery conversion parameter of the present invention;

FIG. 21 is a chart showing the number of operation times necessary for a computation method of the present invention and a computation method of a Montgomery conversion parameter in conventional methods; and FIG. 22 is a chart showing the number of operation times necessary for a computation method of the present invention and a computation method of a Montgomery conversion parameter in conventional methods.

DETAILED DESCRIPTION OF THE INVENTION

Figure 4:
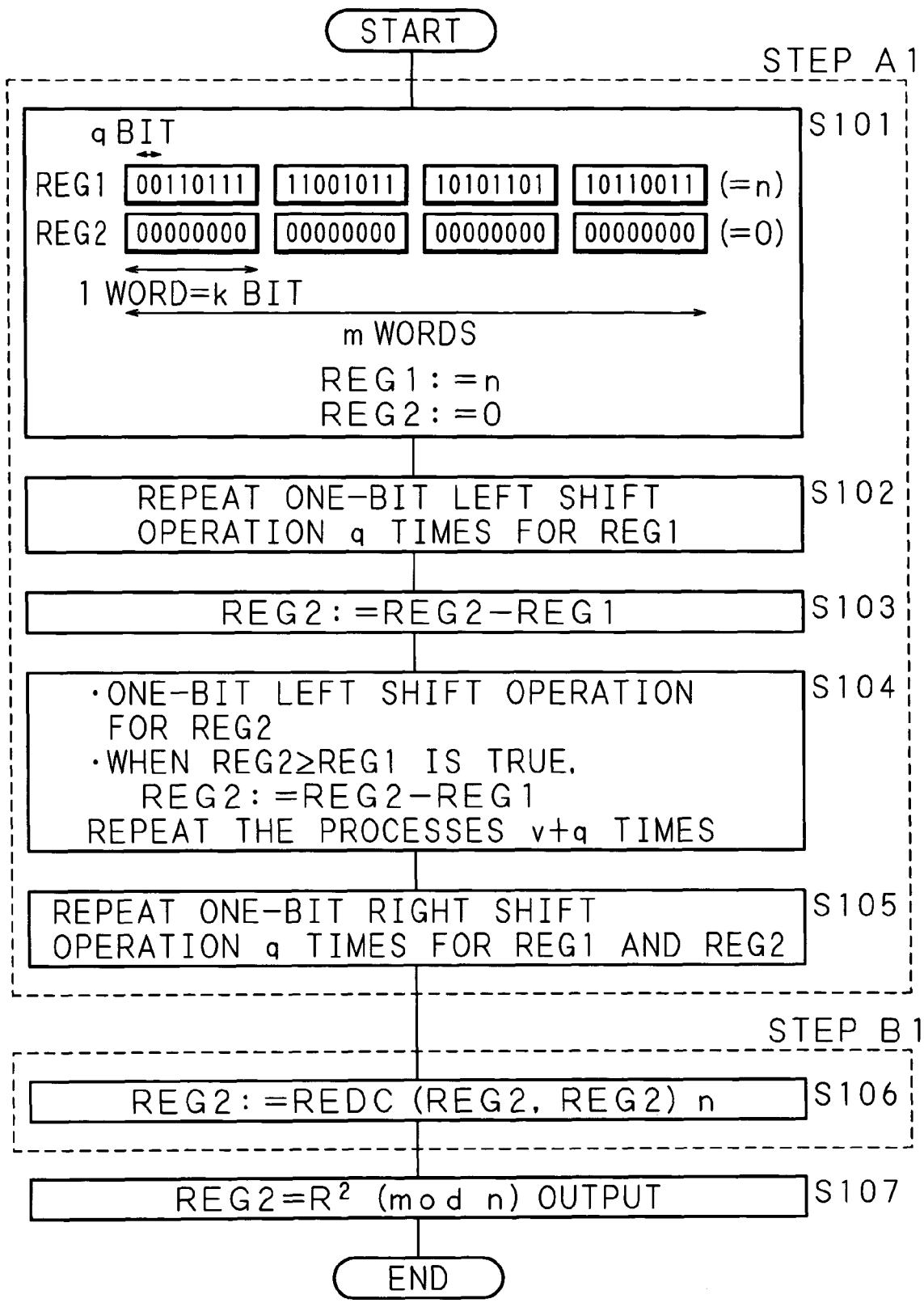
FIG. 4 is a flowchart showing a computation method of a Montgomery conversion parameter in the Conventional Method 1.
Figure 6:
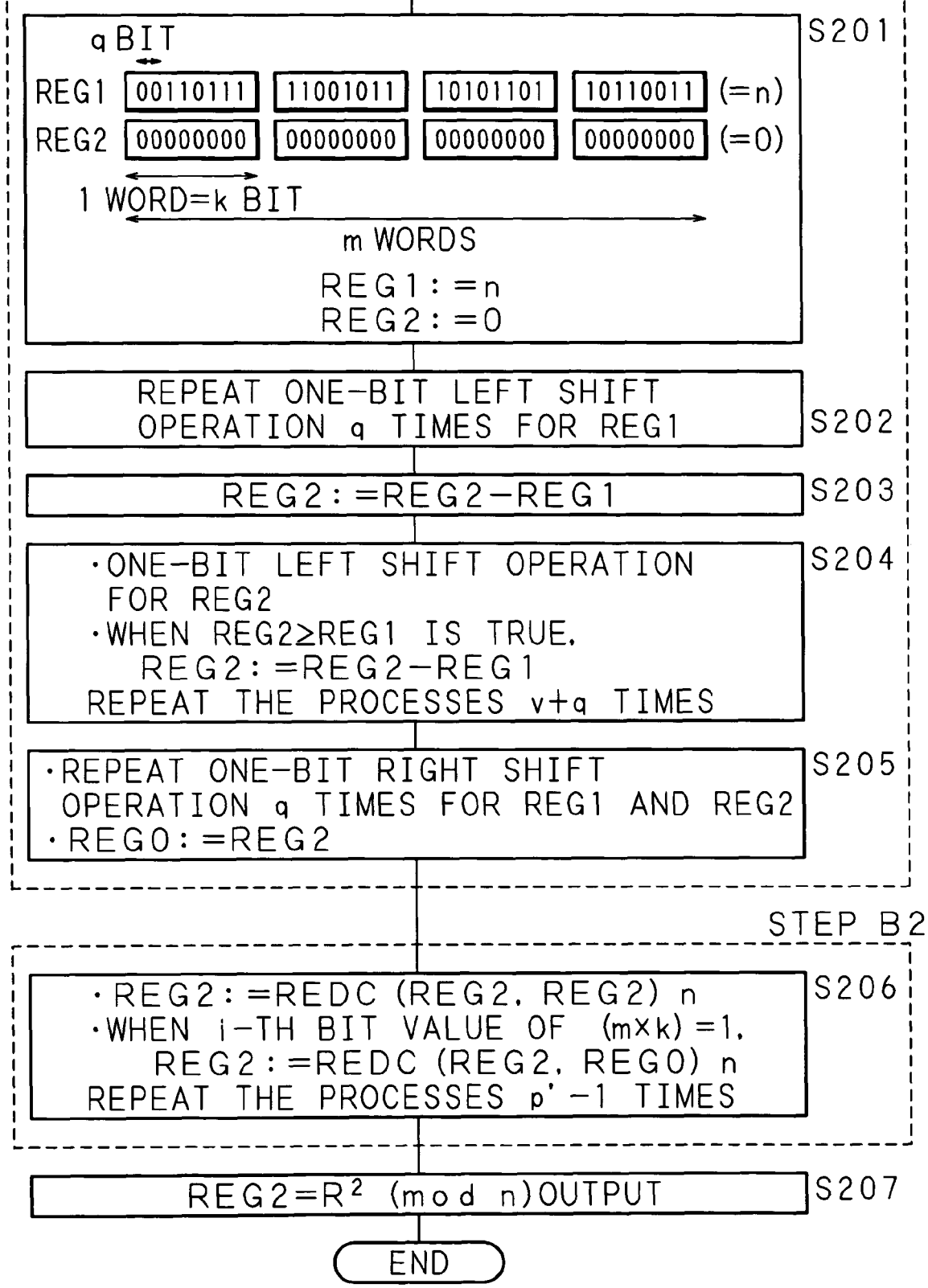
FIG. 6 is a flowchart showing a computation method of a Montgomery conversion parameter in the Conventional Method 2.
Figure 8:
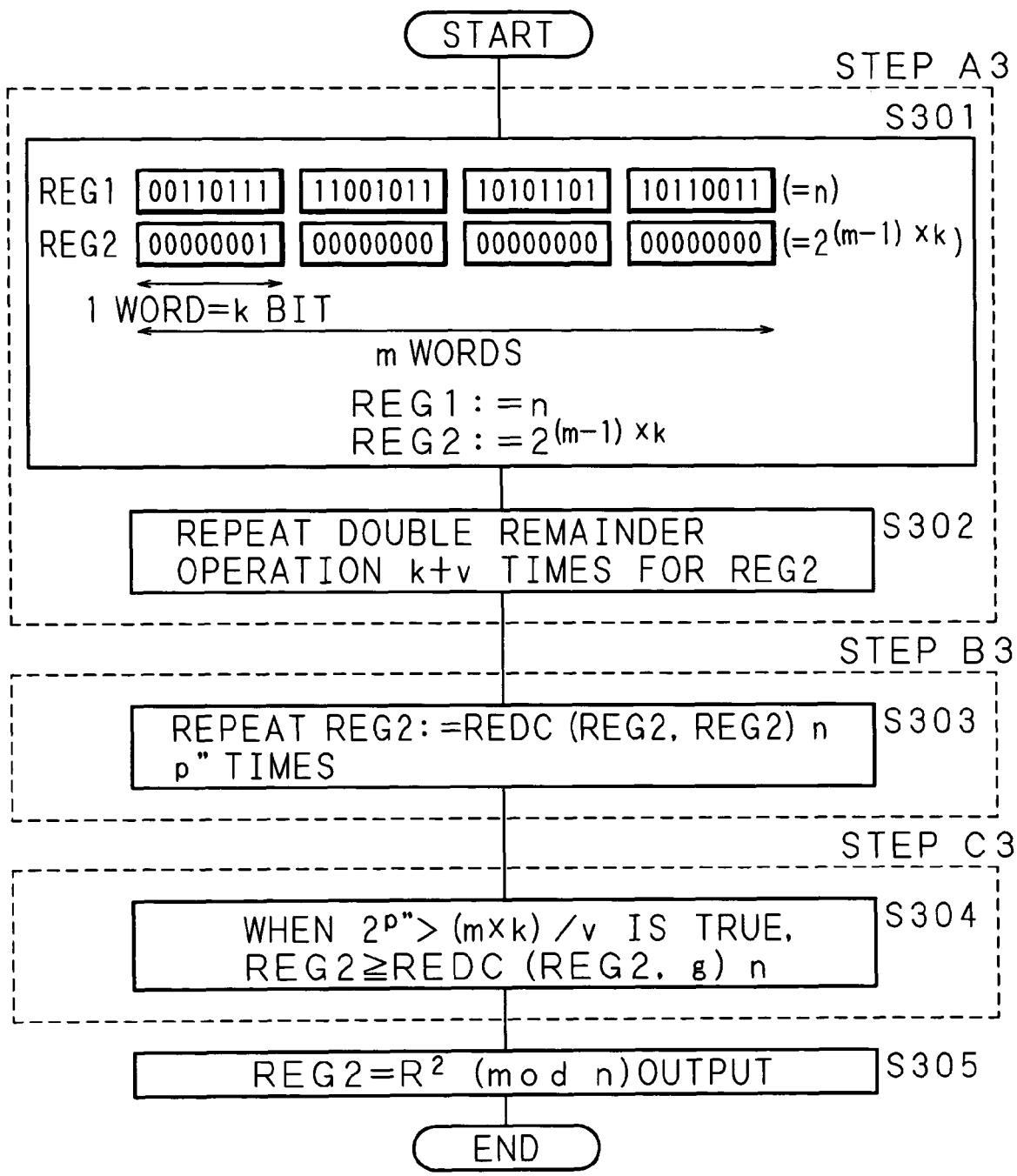
FIG. 8 is a flowchart showing a computation method of a Montgomery conversion parameter in the Conventional Method 3.
Figure 11:
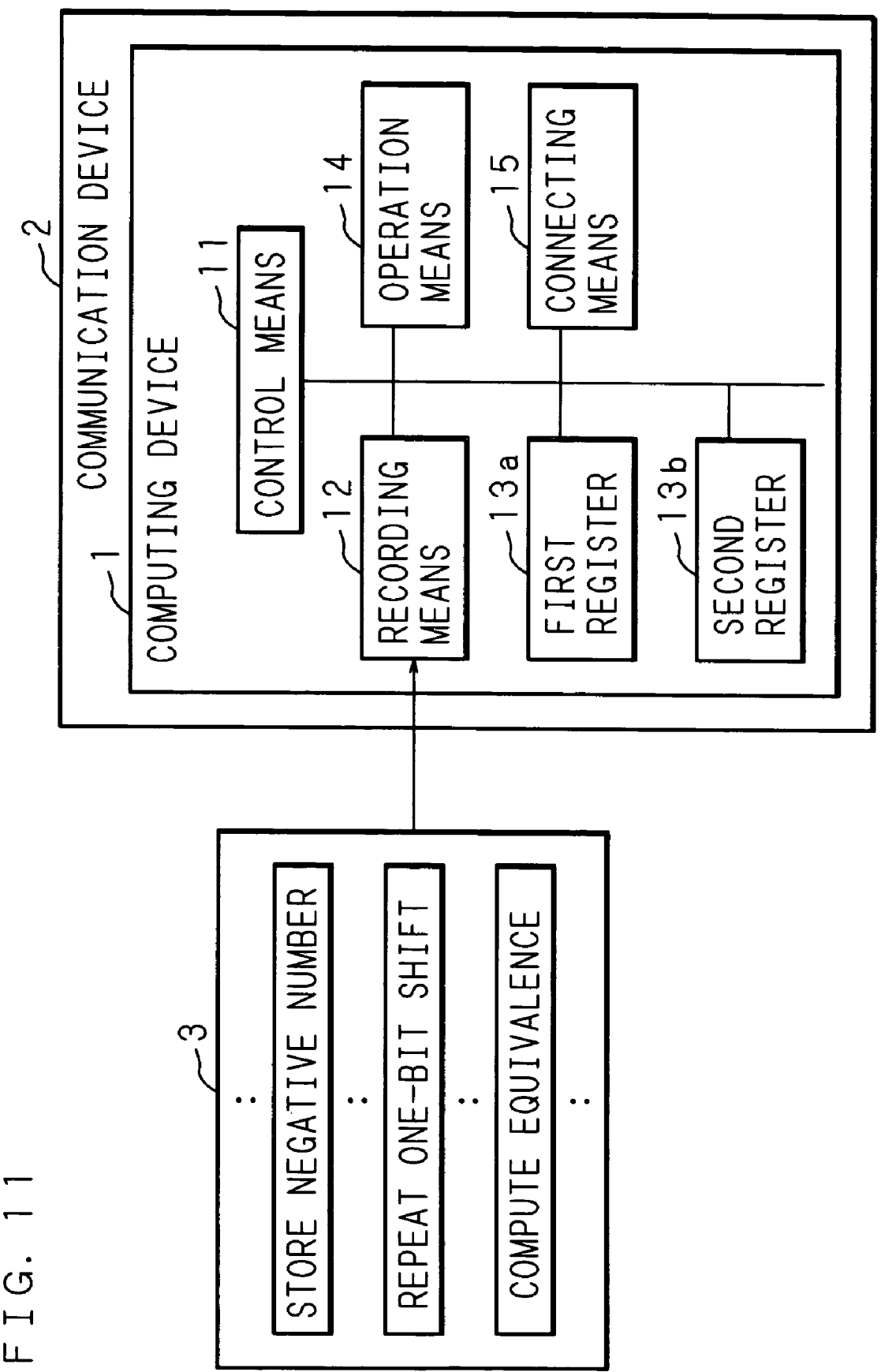
FIG. 11 is a block diagram showing an example of the structure of a computing device of the present invention.

The following description will explain the present invention in detail with reference to the drawings illustrating an embodiment thereof. FIG. 11 is a block diagram showing an example of the structure of a computing device of the present invention. Denoted at 1 in FIG. 11 is a computing device of the present invention such as an operation card which functions as a microcomputer, and the computing device 1 is incorporated in a communication device 2 such as a personal computer or a server computer. The computing device 1 comprises: control means 11 such as an MPU for controlling the entire device; recording means 12 such as various kinds of computer programs such as a computer program 3 and a ROM or a RAM for recording data of the present invention; a first register 13a and a second register 13b to be used for computation; operation means 14 such as a coprocessor for performing an REDC operation; and connecting means 15 which functions as an interface with the communication device 2. By executing the computer program 3 of the present invention recorded in the recording means 12 by the control means 11, the operation card which functions as a microcomputer executes various kinds of procedures as a computing device of the present invention. It should be noted that the first register 13a is a register which can store binary data of m bit and has m words, and the second register 13b is a register which has m or more words.

The computing device 1 of the present invention executes a variety of processes in a process such as communication which uses a cryptographic technology such as a public key cryptosystem. In particular, the computing device 1 of the present invention encrypts plain text information, which is accepted from the communication device 2 via the connecting means 15, with a preliminarily recorded public key to generate ciphertext and outputs the generated ciphertext to the communication device 2 via the connecting means 15. Moreover, when the communication device 2 receives ciphertext, which is encrypted with a public key, from another device, the computing device 1 of the present invention accepts the received ciphertext from the communication device 2 via the connecting means 15, decrypts the ciphertext with a preliminarily recorded secret key to generate plain text and outputs the generated plain text to the communication device 2 via the connecting means 15. It should be noted that the computing device 1 of the present invention may encrypt plain text with a secret key using the same technology and execute a process involved in digital signature for decrypting ciphertext with a public key.

For a cryptographic technology of a public key cryptosystem, a cryptosystem such as RSA cryptography or elliptic curve cryptography is used. For example, in RSA cryptography, ciphertext c which is obtained by encrypting plain text m with a public key e is represented as $c=m^e$ (mod n) using a divisor n of a remainder. Moreover, plain text m which is obtained by decrypting ciphertext c with a secret key d is represented as $m=c^d$ (mod n) using a divisor n of a remainder. As just described, an exponentiation remainder operation represented as $y=a^x$ (mod n) is performed in RSA cryptography. Moreover, a multiplication remainder operation process is also used in elliptic curve cryptography.

The computing device 1 of the present invention performs an encryption process and a decryption process using an operation method, which is referred to as a Montgomery multiplication remainder, uses integers a, b and n and is represented by the following expression, instead of a multiplication remainder operation process.

$$Y = a \times b \times R^{-1} (\text{mod } n)$$

wherein n: integer denoting a divisor of a remainder
a, b: integers which satisfy $0 \leq a, b < n$
R: constant represented by $2^{m*k}$
k: bit length per 1 word
m: the minimum number of words necessary for representing n FIG. 12 is an explanatory view showing the algorithm of a Montgomery multiplication remainder operation relating to a computation method of the present invention. It should be noted that $x=(x_{m-1}, \ldots, x_1, x_0)$ in the algorithm shown in FIG. 12 shows a format for representing an integer x as m word values $x_i$ (i=m-1, ..., 1, 0, $0 \leq x_i < 2^k$). Moreover, the sign ":=" in the following drawings including FIG. 12 and the following explanation denotes to assign a numerical value or an expression on the right-hand side to the left-hand side. A Montgomery multiplication remainder operation $y=a \times b \times R^{-1}$ (mod n) of a case of computing a value y represented by m word values on the basis of a, b and n respectively represented by m word values as shown in FIG. 12 is described as $y=\text{REDC}(a, b)_n$ or just REDC in the following explanation. REDC defined as just described comprises three properties described below.

(Property 1) The divisor n is limited to an odd number.

(Property 2) When both of the values a and b can be represented by m word values and a condition of $a \times b \leq R \times n$ is satisfied, computation of $y=a \times b \times R^{-1}$ (mod n) is performed. Here, $0 \leq y < n$ is satisfied.

(Property 3) When both of the values a and b can be represented by m word values and a condition of $a \times b \leq R \times n$ is not satisfied, computation of $y \equiv a \times b \times R^{-1}$ (mod n) is performed. Here, $0 \leq y < n$ is not always satisfied.

The following description will explain a difference between the computation $y=a \times b \times R^{-1}$ (mod n) described in Property 2 and the computation $y \equiv a \times b \times R^{-1}$ (mod n) described in Property 3. A difference between the computation described in Property 2 and the computation described in Property 3 rests on the fact that the computation described in Property 2 obtains "a remainder value" relating to a divisor n while the computation described in Property 3 obtains "an equivalence" relating to a divisor n.

A remainder y which is computed in division for an integer x relating to a divisor n that is a natural number is referred to as "a remainder (relating to a divisor n)" and is described as y=x (mod n). Since a remainder y in computation of a remainder value takes a value which is larger than or equal to 0 and smaller than n, $0 \leq y < n$ is satisfied in computation of the above Property 2.

On the other hand, a plurality of values x and x' which give the same remainder value that is not always larger than nor equal to 0 and not always smaller than n are referred to as "equivalences (relating to a divisor n)" and are described as $x' \equiv x$ (mod n). That is, when a remainder value y of x, a divisor n and an integer s have the relation of $x'=y+s \times n$, every x' becomes an equivalence of x. For example, on conditions of n=5 and x=13, a remainder value y relating to a divisor n of x becomes y=3. Furthermore, on the same conditions, a series of values of x'=3, 8, 13, 18, 23, . . . are equivalent relating to a divisor n and a remainder value thereof is 3. As just described, an equivalence is a series of values which give the same remainder relating to a divisor n and is not limited to a value larger than or equal to 0 and smaller than n. Accordingly, $0 \leq y < n$ is not always satisfied in the computation of the above Property 3.

As described above, a Montgomery multiplication remainder operation is $a \times b \times R^{-1}$ (mod n) and performs an operation different from a normal multiplication remainder operation $a \times b$ (mod n). Accordingly, in order to execute an exponentiation remainder operation properly, it is necessary to convert input data to be given to a Montgomery multiplication remainder into data which is referred to as Montgomery system. When arbitrary input data to be given to a normal multiplication remainder operation is represented as x, data obtained by converting x into Montgomery system is represented as x', conversion (Montgomery conversion) from x into x' is represented as x'=Mont (x) and conversion (Montgomery inversion) from x' to x is represented as x=Mont$^{-1}$ (x'), these are given by the following expressions.

$$\text{Montgomery conversion: } x' = \text{Mont}(x) = x \times R \ (\text{mod } n)$$

$$\text{Montgomery inversion: } x = \text{Mont}^{-1}(x') = x' \times R^{-1} \ (\text{mod } n)$$

The Montgomery conversion and the Montgomery inversion represented by the above expressions can be represented by the following expressions using REDC. Here, H is a value which is referred to as a Montgomery conversion parameter represented as H≡R² (mod n) and is obtained by prior computation.

Montgomery conversion: $x' = REDC(x, H)_n = x \times R^2 \times R^{-1} = x \times R \pmod{n}$ wherein H≡R² (mod n)

Montgomery inversion: $x = REDC(x', 1)_n = x' \times 1 \times R^{-1} = x' \times R^{-1} \pmod{n}$ The following description will explain the algorithm of an exponentiation remainder operation which uses a Montgomery multiplication remainder based on the above expressions. FIG. 13 is an explanatory view showing the algorithm of an exponentiation remainder operation which uses a Montgomery multiplication remainder operation relating to a computation method of the present invention. FIG. 13 shows the algorithm of a Montgomery multiplication remainder operation based on an exponentiation remainder operation which is referred to as a binary method and computes an exponentiation remainder operation result $y = a^d \pmod{n}$ from the input values a, d and n. The process in the first line of FIG. 13 denotes to give 1 as an initial value of y. The process in the second line denotes to compute a Montgomery conversion parameter H'≡R² (mod n). The process in the third line denotes to perform Montgomery conversion for y and a to obtain y' and a'. The loop in the fourth to seventh lines denotes to repeat a process of performing the Montgomery multiplication remainder once or twice according to the bit value of d from the least significant bit of d to the most significant bit. The process in the eighth line denotes to perform Montgomery inversion for y' computed in the loop in the fourth to seventh lines to obtain a final operation result y.

Figure 14:
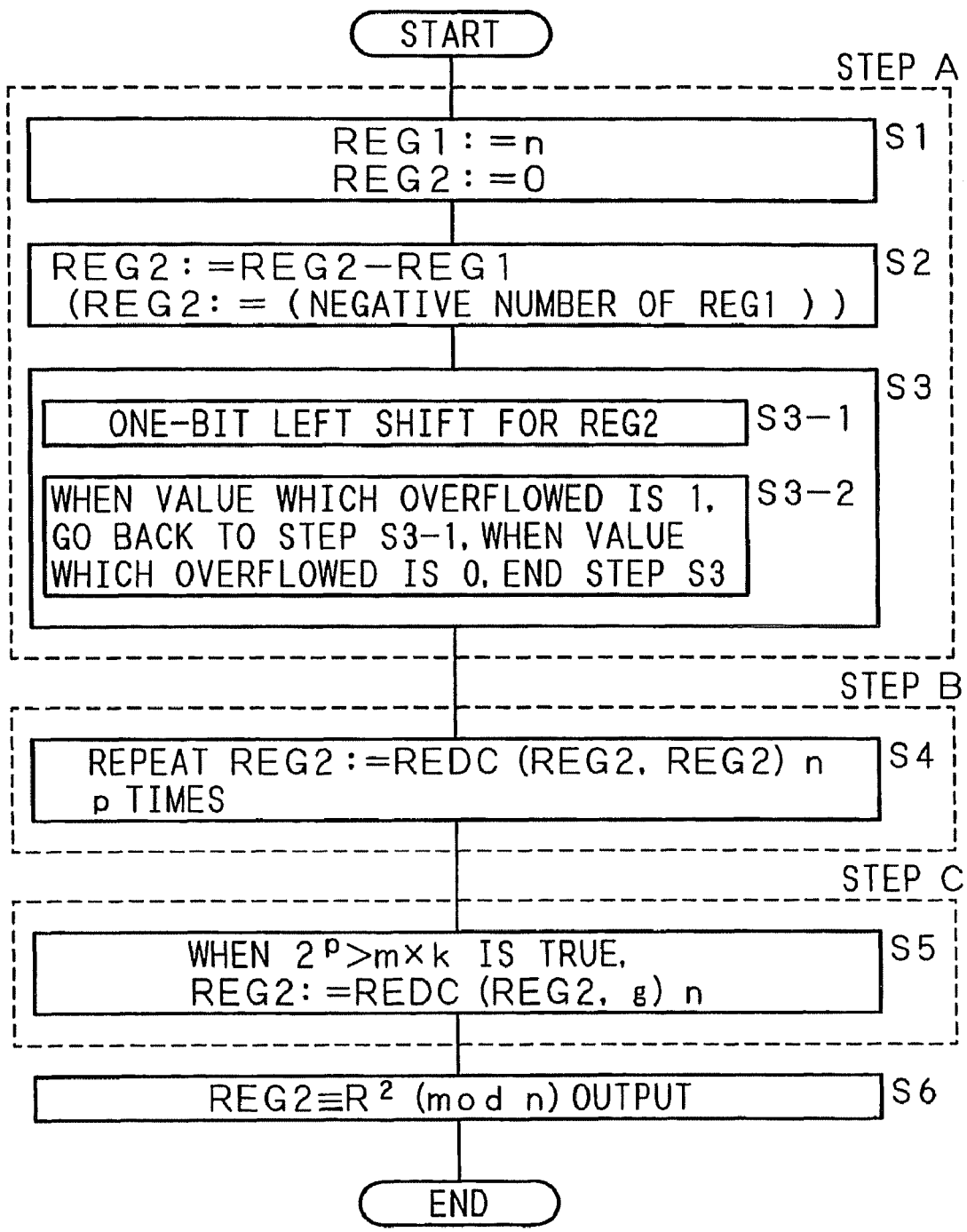
FIG. 14 is a flowchart showing a process of a computing device of the present invention.

The following description will explain the process of computing a Montgomery conversion parameter H≡R² (mod n) performed in the second line of the algorithm shown in FIG. 13. FIG. 14 is a flowchart showing a process of the computing device 1 of the present invention. FIG. 14 shows a process, by the computing device 1 of the present invention, of accepting input of a divisor n of a remainder, executing a computation process of the present invention and outputting H≡R² (mod n) which is an equivalence of R² (mod n). It should be noted that k denotes a bit length per 1 word and n is a value represented by m word values in the following explanation. Moreover, $R = 2^{m*k}$. It should be noted that the sign "*" in the following drawings and the following explanation denotes the multiplication symbol "×".

A conversion method of a Montgomery conversion parameter of the present invention is mainly composed of a step A, a step B and a step C. The step A is a step of computing an equivalence $H_0 \equiv 2^{m*k+1} \pmod{n}$ relating to a divisor n of $2^{m*k+1}$. The step B is a step of computing an equivalence $H \equiv 2^{E(p, m, k)} \pmod{n}$ of $2^{E(p, m, k)} \pmod{n}$ from $H_0$ by an REDC operation. Here, p is an integer which satisfies $2^{p-1} < m \times k \leq 2^p$, and $E(p, m k) = m \times k + 2^p$. The step C is a step of performing a correction operation by $H = REDC(H, G)_n$ for $g = 2^{k*G(p, m, k)}$ when $2^p > m \times k$. Here, G is represented as $G(p, m, k) = 2 \times m - 2^p / k$ and is an integer which satisfies the range of $1 \leq G(p, m, k) \leq m-1$.

The computing device 1 of the present invention performs initialization for giving "n" and "0" as initial values respectively to the first register 13a and the second register 13b, as the process of the step S1 in the step A. Here, the significant word length of n is m.

Figure 15:
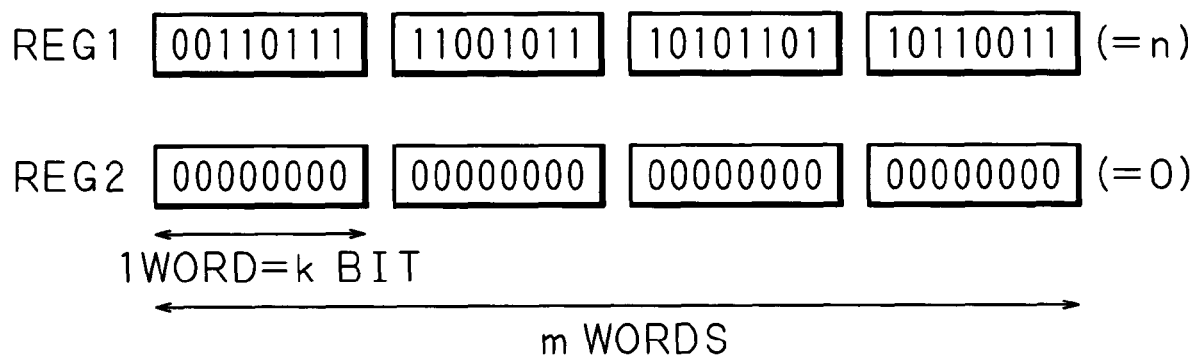
FIG. 15 is an explanatory view schematically showing values to be stored in a first register and a second register comprised in a computing device of the present invention.

FIG. 15 is an explanatory view schematically showing values to be stored in the first register 13a and the second register 13b comprised in the computing device 1 of the present invention. In FIG. 15, REG1 denotes a value stored in the first register 13a and REG2 denotes a value stored in the second register 13b. In FIG. 15 showing a state where the process of the step S1 in the step A has been performed, n is stored as an initial value in the first register 13a and 0 is stored as an initial value in the second register 13b.

Going back to the flowchart shown in FIG. 14, the computing device 1 of the present invention computes an equivalence $REG2 \equiv 2^{m*k} \pmod{n}$ relating to a divisor n and $2^{m*k}$ as the process of the step S2 in the step A. The process of the step S2 in the step A is performed by a process of subtracting a value stored in the first register 13a from a value stored in the second register 13b and storing a negative number of a divisor n, which is the obtained result, in the second register 13b.

The result obtained by subtracting a value stored in the first register 13a from a value stored in the second register 13b, i.e. REG2−REG1=0−n, which can be represented in a form of $2^{m*k} + s \times n$ using an integer s, is an equivalence relating to a divisor n and $2^{m*k}$ and is a value which can be represented by m words.

It should be noted that the process of the step S2 in the step A may be performed by obtaining a complement value of 2 relating to a value n stored in the first register 13a and storing the obtained complement value of 2 in the second register 13b, instead of performing the operation process (REG2:=REG2−REG1). The complement value of 2 relating to a value n can be obtained by inverting the total bit of n stored in the first register 13a and then setting 1 to the least significant bit thereof.

FIG. 16 is an explanatory view schematically showing values to be stored in the first register 13a and the second register 13b comprised in the computing device 1 of the present invention. In FIG. 16 showing a state where the process of the step S2 in the step A has been performed, n is stored as an initial value in the first register 13a and an equivalence relating to a divisor n of $2^{m*k}$, which has been computed as 0−n, is stored in the second register 13b.

Going back to the flowchart shown in FIG. 14, the computing device 1 of the present invention computes an equivalence $REG2 \equiv 2^{m*k+1} \pmod{n}$ relating to a divisor n and $2^{m*k+1}$, as the process of the step S3 in the step A. The process of the step S3 in the step A, in particular, includes: a process (step S3-1) of performing a one-bit left shift operation for a value stored in the second register 13b; and a process (step S3-2) of judging a value which overflowed by the one-bit left shift operation, i.e. the most significant bit value before the operation. The process of performing a one-bit left shift operation of the step S3-1 is a process of carrying a value in each digit of the second register 13b, i.e. a process of doubling a value stored in the second register 13b and discarding the bit value of the most significant digit as a value which overflowed. Then, in the step S3-2, when it is judged that the value which overflowed is "1", it is judged that the value stored in the second register 13b is a value of an equivalence relating to a divisor n and $2^{m*k}$ and the process goes back to the step S3-1 to repeat the following processes. On the other hand, when it is judged that the value which overflowed is "0", it is judged that the value stored in the second register 13b is a value of an equivalence relating to a divisor n and $2^{m*k+1}$ and the process of the step S3 ends.

It should be noted that the process of the step S3-1 of the step S3 in the step A may be alternated with a process of adding a value stored in the second register 13b to the value stored in the second register 13b, i.e. a process of performing an operation process (REG2:=REG2+REG2). Moreover, the process of the step S3-2 may be alternated with a process of judging the existence of generation of a carry value by the process of the step S3-1. In this case, the process goes back to the step S3-1 when it is judged that a carry value has been generated while the process of the step S3 ends when it is judged that no carry value has been generated.

FIGS. 17A-17D are explanatory views schematically showing values to be stored in the second register 13b comprised in the computing device 1 of the present invention. It should be noted that the numerical values shown in the quadrangles shown in broken lines in FIGS. 17B-17D denote values which overflowed by the one-bit left shift operation. FIG. 17A shows a state before the process of the step S3 in the step A is executed, and REG2≡$2^{m*k}$ (mod n). FIG. 17B shows a state where a one-bit left shift operation process has been executed once in the step S3-1 after the state of FIG. 17A, and REG2≡$2^{m*k}$ (mod n). A value which overflowed is "1" as shown in FIG. 17B, the process goes back to the step S3-1 and a one-bit left shift operation is executed again. A state where the second one-bit left shift operation has been executed is shown in FIG. 17C, and REG2≡$2^{m*k}$ (mod n). Since a value which overflowed is "1" as shown in FIG. 17C, the process goes back to the step S3-1 and a one-bit left shift operation is executed again. A state where the third one-bit left shift operation has been executed is shown in FIG. 17D. Since a value which overflowed is "0" as shown in FIG. 17D, it is judged that REG2≡$2^{m*k+1}$ (mod n) and the process of the step S3 ends. As just described, in the step S3 in the step A, it is possible to compute an equivalence of $2^{m*k+1}$ at the end of the step S3 while keeping the result within a range of m words, by repeating a one-bit left shift operation while truncating a bit value which overflowed.

The following description will explain the reason that it is possible to compute an equivalence of $2^{m*k+1}$ by the process of the step S3 in the step A. FIGS. 18A, 18B, 19A and 19B are explanatory views schematically showing values to be stored in the second register 13b comprised in the computing device 1 of the present invention. FIGS. 18A and 18B show a case where a value which overflows by executing the process of the step S3 in the step A is "0", and FIG. 18A shows a state before the one-bit left shift operation process is executed while FIG. 18B shows a state after the one-bit left shift operation process is executed. FIGS. 19A and 19B show a case where a value which overflows by executing the process of the step S3 in the step A is "1", and FIG. 19A shows a state before the one-bit left shift operation process is executed while FIG. 19B shows a state after the one-bit left shift operation process is executed.

As shown in FIGS. 18B and 19B, a value of m×k+1 bit including the 1 bit which overflowed immediately after executing the one-bit left shift operation process, which is a value obtained by doubling a value shown in FIGS. 18A and 19A that is an equivalence of $2^{m*k}$ (mod n), is an equivalence of $2^{m*k+1}$ (mod n). When a value of the most significant bit which overflowed is "0" as shown in FIG. 18B, a value stored in the second register 13b is an equivalence of $2^{m*k+1}$ (mod n) obtained by doubling $2^{m*k}$ (mod n) since the real number is not changed by truncation of the most significant bit which overflowed. When a value of the most significant bit which overflowed is "1" as shown in FIG. 19B, the truncation of the most significant bit is subtraction of $2^{m*k}$ from $2^{m*k+1}$ (mod n) obtained by doubling $2^{m*k}$ (mod n) and the result thereof is an equivalence of $2^{m*k}$ (mod n). That is, REG2≡2×$2^{m*k}$ (mod n)−$2^{m*k}$ (mod n)≡$2^{m*k}$ (mod n).

As just described, in the step A of the computing device 1 of the present invention, it is possible to compute a value of $H_0$≡$2^{m*k+1}$ (mod n), which is an equivalence relating to a divisor n and $2^{m*k+1}$, by repeating a one-bit left shift operation process and a judgment process for a bit value which overflowed in the step S3.

Going back to the flowchart shown in FIG. 14, as the process of the step S4 in the step B, the computing device 1 of the present invention repeats a process of executing an REDC operation which is represented by REDC (REG2, REG2)$_n$ by the operation means 14 and storing the result thereof in the second register 13b p times for i=1, 2, . . . , p, to compute REG2=$2^{E(p, m, k)}$ (mod n). Here, p is an integer which satisfies $2^{p-1}$<m×k≦$2^p$, E(p, m, k)=m×k+$2^p$ and REDC (A, B)$_n$ represents a Montgomery multiplication remainder operation REDC (A, B)$_n$=$2^{-m*k}$×A×B (mod n).

As the process of the step S5 in the step C, the computing device 1 of the present invention judges true/false of $2^p$>m×k, and performs a correction operation of executing an REDC operation represented as REDC (REG2, g)$_n$ by the operation means 14 and stores the result thereof in the second register 13b when it is judged that $2^p$>m×k is true. It should be noted that the correction operation of executing an REDC operation by the operation means 14 is not performed when it is judged that $2^p$>m×k is false. Here, g=$2^{k*G(p, m, k)}$ and G(p, m, k)=2×m−$2^p$/k.

As the process of the step S6, the computing device 1 of the present invention outputs the computation result stored in the second register 13b, i.e. REG2≡$R^2$ (mod n), and ends the process. The computing device 1 of the present invention then executes an exponentiation remainder operation using $R^2$ (mod n), which is the outputted result, and further performs encryption and/or decryption.

FIG. 20 is a chart showing the number of operation times necessary for a computation method of a Montgomery conversion parameter of the present invention. FIG. 20 shows the number of operation times necessary for a computation method of a Montgomery conversion parameter of the present invention shown using FIG. 14, by type and step of operations. It should be noted that SFT denotes a shift operation of performing one-bit shift, SUB denotes subtraction, CPL denotes complement computation of 2, BITCHK denotes detection computation of a one-bit value and REDC denotes a Montgomery multiplication remainder operation in FIG. 20. Moreover, in FIG. 20, q denotes the number of successive "0" from the most significant digit of n.

The following description will explain an example of the number of operation times of a computation method of the present invention with reference to the chart shown in FIG. 20.

Example 1

Application to Computation of RSA Cryptography (1 Word is 32 Bit: k=32) of 1024 Bit The following description will explain an example of a case of n=$2^{1023}$+1 as a divisor n of 1024 bit. A value to be used in RSA cryptography is limited on a condition that n must be a product of two primes p and q, and n in Example 1 does not satisfy this condition. However, in the computation method of the present invention, which is a method for computing an equivalence H≡$2^{2*m*k}$ (mod n) relating to a divisor n of $2^{2*m*k}$ when the divisor n is an arbitrary odd value, n is not limited to a product of primes. Accordingly, even though n in this example does not satisfy the condition of RSA cryptography, it is considered that understanding of Example 1 of the present invention is facilitated since n is a value which satisfies a condition according to the computation method of the present invention and can be represented by an extremely simple form. Based on the above description, the following description will explain an example of a case of n=$2^{1023}$+1 as n of 1024 bit.

Since 1 word is 32 bit as described in the condition in the heading, 1024 bit is represented by 32 words and therefore m=32. The amount of computation necessary for computing $H_0 \equiv 2^{2*m*k} \pmod{n} \equiv 2^{2048} \pmod{n}$ is 1 time of SFT, 1 time of SUB (CPL), 1 time of BITCHK and 10 times of REDC as understood from FIG. 20. The concrete computation will be described below.

Step S1 in Step A

REG1:=n=(100 . . . 01)$_{2, 1024}$
REG2:=0

The first register 13a and the second register 13b are initialized. Here, a=(b)$_{2, c}$ represents that the result of representing a value a in a binary number of c bit is b.

Step S2 in Step A.

REG2:=0−n=(0111 . . . 11)$_{2, 1024}$

It should be noted that the same result can be also obtained for REG2:=(complement of 2 of REG1). Moreover, the total bit of REG1 may be inverted and 1 may be further set in the least significant bit thereof.

Step S3 in Step A

A one-bit left shift operation is performed for REG2=(0111 . . . 11)$_{2, 1024}$ to give REG2=(111 . . . 110)$_{2, 1024}$. Then, it is judged that the value which overflowed is "0" and the process goes to the step S4. It should be noted that the operation result is borne out here by REG2 (mod n)=(111 . . . 110)$_{2, 1024}$ (mod n)=(011 . . . 1100)$_{2, 1024}$ and $2^{1025}$ (mod n)=(011 . . . 1100)$_{2, 1024}$.

Step S4 in Step B

REG2:=REDC (REG2, REG2)

The above process is repeated p=10 times which is decided from $2^9 < m \times k = 1024 \leq 2^{10}$.

First Time $REG2 := REDC(REG2, REG2)$
$$\equiv 2^{1024+1} \times 2^{1024+1} \times 2^{-1024}$$
$$\equiv 2^{1024+2} (mod\ n)$$

Second Time $REG2 := REDC(REG2, REG2)$
$$\equiv 2^{1024+2} \times 2^{1024+2} \times 2^{-1024}$$
$$\equiv 2^{1024+4} (mod\ n)$$

Third Time $REG2 := REDC(REG2, REG2)$
$$\equiv 2^{1024+4} \times 2^{1024+4} \times 2^{-1024}$$
$$\equiv 2^{1024+8} (mod\ n)$$

⋮

Ninth Time $REG2 := REDC(REG2, REG2)$
$$\equiv 2^{1024+256} \times 2^{1024+256} \times 2^{-1024}$$
$$\equiv 2^{1024+512} (mod\ n)$$

Tenth Time $REG2 := REDC(REG2, REG2)$
$$\equiv 2^{1024+512} \times 2^{1024+512} \times 2^{-1024}$$
$$\equiv 2^{1024+1024} (mod\ n)$$

$REG2 \equiv 2^{2048} (mod\ n)$ is obtained from the above computation

Step S5 in Step C

The correction operation is not executed since $2^p$ ($=2^{10}$)> m×k (=1024) is false.

Step S6

REG2≡$H_0 \equiv 2^{2048}$ (mod n) is outputted and the process ends.

Example 2

Application to Computation of Elliptic Curve Cryptography (1 Word is 8 Bit: k=8) of 163 Bit The following description will explain an example of a case of n=0x7, 0263d95a, 880adfbc, e3c1648d, 44ce22fa, 813980fb as a divisor n of 163 bit. Here, the above 0x . . . denotes a numerical value represented by a hexadecimal number. Since 1 word is 8 bit, 163 bit is represented by 21 words and therefore m=21. The amount of computation necessary for computing $H_0 \equiv 2^{2*m*k} \pmod{n} \equiv 2^{326} \pmod{n}$ is 6 times of SFT, 1 time of SUB (CPL), 6 times of BITCHK and 8 times of REDC as understood from FIG. 20. The concrete computation will be described below.

Step S1 in Step A

REG1:=n=0x7, 0263d95a, 880adfbc, e3c1648d, 44ce22fa, 813980fb
REG2:=0

Step S2 in Step A

REG2:=0−n=0xf8, fd9c26a5, 77f52043, 1c3e9b72, bb31dd05, 7ec67f05

It should be noted that the same goes for REG2:=(complement of 2 of REG1).

Step S3 in Step A

A one-bit left shift operation is performed for REG2=0xf8, fd9c26a5, 77f52043, 1c3e9b72, bb31dd05, 7ec67f05 to give REG2=0xf1, fb384d4a, efea4086, 387d36e5, 7663ba0a, fd8cfe0a. Here, it is judged that the value which overflowed is "1" and the same process is repeated. That is, for the second process:

a one-bit left shift operation is performed for REG2=0xf1, fb384d4a, efea4086, 387d36e5, 7663ba0a, fd8cfe0a to give REG2=0xe3, f6709a95, dfd4810c, 70fa6dca, ecc77415, fb19fc14. Here, it is judged that the value which overflowed is "1" and the same process is repeated. That is, for the third process:

a one-bit left shift operation is performed for REG2=0xe3, f6709a95, dfd4810c, 70fa6dca, ecc77415, fb19fc14 to give REG2=0xc7, ece1352b, bfa90218, e1f4db95, d98ee82b, f633f828. Here, it is judged that the value which overflowed is "1" and the same process is repeated. That is, for the fourth process:

a one-bit left shift operation is performed for REG2=0xc7, ece1352b, bfa90218, e1f4db95, d98ee82b, f633f828 to give REG2=0x8f, d9c26a57, 7f520431, c3e9b72b, b31dd057, ec67f050. Here, it is judged that the value which overflowed is "1" and the same process is repeated. That is, for the fifth process:

a one-bit left shift operation is performed for REG2=0x8f, d9c26a57, 7f520431, c3e9b72b, b31dd057, ec67f050 to give REG2=0x1f, b384d4ae, fea40863, 87d36e57, 663ba0af, d8cfe0a0. Here, it is judged that the value which overflowed is "1" and the same process is repeated. That is, for the sixth process:

a one-bit left shift operation is performed for REG2=0x1f, b384d4ae, fea40863, 87d36e57, 663ba0af, d8cfe0a0 to give REG2=0x3f, 6709a95d, fd4810c7, 0fa6dcae, cc77415f, b19fc140. Here, it is judged that the value which overflowed is "0" and the process goes to the step S4. It should be noted that the operation result is borne out here by REG2 (mod n)=$2^{169}$ (mod n)=0x5187052f, 34e63323, 0dda53b7, 61380691, 269a386d.

Step S4 in Step B

REG2:=REDC (REG2, REG2)

The above process is repeated p=8 times which is decided by $2^7 < m \times k = 1024 \leq 2^8$.

First Time $REG2 := REDC(REG2, REG2)$
$$\equiv 2^{168+1} \times 2^{168+1} \times 2^{-168}$$
$$\equiv 2^{168+2} (mod\ n)$$

Second Time $REG2 := REDC(REG2, REG2)$
$$\equiv 2^{168+2} \times 2^{168+2} \times 2^{-168}$$
$$\equiv 2^{168+4} (mod\ n)$$

Third Time $REG2 := REDC(REG2, REG2)$
$$\equiv 2^{168+4} \times 2^{168+4} \times 2^{-168}$$
$$\equiv 2^{168+8} (mod\ n)$$

$\vdots$

Seventh Time $REG2 := REDC(REG2, REG2)$
$$\equiv 2^{168+64} \times 2^{168+64} \times 2^{-168}$$
$$\equiv 2^{168+128} (mod\ n)$$

Eighth Time $REG2 := REDC(REG2, REG2)$
$$\equiv 2^{168+128} \times 2^{168+128} \times 2^{-168}$$
$$\equiv 2^{168+256} (mod\ n)$$

$REG2 \equiv 2^{424} (mod\ n)$ from the above computation.

Step S5 in Step C

Since $2^p (=2^8) > m \times k (=168)$ is true, a correction operation is executed.

Correction Operation $$REG2 := REDC(REG2, g) = 2^{424} \times 2^{80} \times 2^{-168} = 2^{336}$$

It should be noted that, in the above computation, $$G(p, m, k) = 2 \times m - (2^{p/k})$$

$$G(8, 21, 8) = 2 \times 21 - (2^8/8) = 10$$

Furthermore, $$g = 2^{k*G(p, m, k)} = 2^{8*10} = 2^{80}$$

A correction operation is executed using $g=2^{80}$ which is decided as described above.

Step S6

$REG2 \equiv H \equiv 2^{336}$ (mod n) is outputted and the process ends.

Example 3

Application to Computation of Elliptic Curve Cryptography (1 Word is 32 Bit: k=32) of 160 Bit The following description will explain an example of a case of n=0x89381a5a, 0ff02e5e, 42d13b94, b6e022e6, 96f53721 as a divisor n of 160 bit. Here, the above 0x . . . denotes a numerical value represented by a hexadecimal number. Since 1 word is 32 bit, 160 bit is represented by 5 words and therefore m=5. The amount of computation necessary for computing $H \equiv 2^{2*m*k}$ (mod n) $\equiv 2^{320}$ (mod n) is 1 time of SFT, 1 time of SUB (CPL), 1 time of BITCHK and 8 times of REDC as understood from FIG. 20. The concrete computation will be described below.

Step S1 in Step A

REG1:=n=0x89381a5a, 0ff02e5e, 42d13b94, b6e022e6, 96f53721

REG2:=0

Step S2 in Step A

REG2:=0−n=0x76c7e5a5, f00fd1a1, bd2ec46b, 491fdd19, 690ac8df

It should be noted that the same goes for REG2:=(complement of 2 of REG1).

Step S3 in Step A

A one-bit left shift operation is performed for REG2=0x76c7e5a5, f00fd1a1, bd2ec46b, 491fdd19, 690ac8df to give REG2=0xed8fcb4b, e01fa343, 7a5d88d6, 923fba32, d21591be. Here, it is judged that the value which overflowed is "0" and the process goes to the step S4. It should be noted that the operation result is borne out here by REG2 (mod n)=$2^{161}$ (mod n)=0x6457b0f1, d02f74e5, 378c4d41, db5f974c, 3b205a9d.

Step S4 in Step B

REG2:=REDC (REG2, REG2)

The above process is repeated p=8 times which is decided by $2^7 < m \times k = 1024 \leq 2^8$.

First Time $REG2 := REDC(REG2, REG2) = 2^{160+1} \times 2^{160+1} \times 2^{-160} \equiv 2^{160+2} (mod\ n)$ Second Time $REG2 := REDC(REG2, REG2) = 2^{160+2} \times 2^{160+2} \times 2^{-160} \equiv 2^{160+4} (mod\ n)$ Third Time $REG2 := REDC(REG2, REG2) = 2^{160+4} \times 2^{160+4} \times 2^{-160} \equiv 2^{160+8} (mod\ n)$ $\vdots$ Seventh Time $REG2 := REDC(REG2, REG2) = 2^{160+64} \times 2^{160+64} \times 2^{-160} \equiv 2^{160+128} (mod\ n)$ Eighth Time $REG2 := REDC(REG2, REG2) = 2^{160+128} \times 2^{160+128} \times 2^{-160} \equiv 2^{160+256} (mod\ n)$ $REG2 \equiv 2^{416}$ (mod n) from the above computation.

Step S5 in Step C

Since $2^p (=2^8) > m \times k (=160)$ is true, a correction operation is executed.

Correction Operation $$REG2 := REDC(REG2, g) = 2^{416} \times 2^{64} \times 2^{-160} = 2^{320}$$

It should be noted that, in the above computation, $$G(p, m, k) = 2 \times m - (2^{p/k})$$

$$G(8, 5, 32) = 2 \times 5 - (28/32) = 2$$

Furthermore, $$g = 2^{k*G(p, m, k)} = 2^{32*2} = 2^{64}$$

A correction operation is executed using $g=2^{64}$ which is decided as described above.

Step S6

$REG2 \equiv H \equiv 2^{320}$ (mod n) is outputted and the process ends.

Next, the number of operation times of a computation method of the present invention and the above Conventional Method 1 to Conventional Method 3 will be compared. FIG. 21 is a chart showing the number of operation times necessary for a computation method of the present invention and a computation method of a Montgomery conversion parameter in conventional methods. FIG. 21 shows the amount of computation of the step A, step B and step C of the computation method of the present invention shown in FIG. 20, the amount of computation of the step A1 and step B1 of the Conventional Method 1 shown in FIG. 5, the amount of computation of the step A2 and step B2 of the Conventional Method 2 shown in FIG. 7 and the amount of computation of the step A3, step B3 and step C3 of the Conventional Method 3 shown in FIG. 9. It should be noted that the processing load necessary for operations of the shift operation SFT, the subtraction SUB, the complementation computation CPL of 2 and the comparison operation CMP, which are multi-bit operations, is regarded as identical so as to facilitate comparison of processing load in the respective computation methods, and these are shown replaced with a constant LC. Moreover, the amount of computation of the detection computation BITCHK of a one-bit value is denoted as a constant SC and the amount of computation of a Montgomery multiplication remainder operation REDC is denoted as a constant REDC. It should be noted that it is assumed that BITCHK<LC, REDC is satisfied since BITCHK, which is a one-bit operation, has a smaller amount of computation than multi-bit operations. The lines shown as LC and SC in FIG. 21 show the amount of computation involved in the step A1 of the Conventional Method 1, the step A2 of the Conventional Method 2, the step A3 of the Conventional Method 3 and the step A in a computation method of the present invention. Moreover, the line shown as REDC shows the amount of computation involved in the step B1 of the Conventional Method 1, the step B2 of the Conventional Method 2, the step B3 and step C3 of the Conventional Method 3 and the step B and step C in a computation method of the present invention.

First, the amount of computation involved in the step A1 of the Conventional Method 1, the step A2 of the Conventional Method 2 and the step A3 of the Conventional Method 3 and the amount of computation involved in the step A in a computation method of the present invention will be compared. A difference between the amount of computation of the step A1 of Convention Method 1 or the step A2 of the Conventional Method 2 and the amount of computation of the step A in a computation method of the present invention is computed below.

(amount of computation of Conventional Method 1 or Conventional Method 2)−(amount of computation in a computation method of the present invention)

$= (5.5q+2.5v+1) \times LC - ((q+2) \times LC + (q+1) \times SC)$ $= (4.5q+2.5v-1) \times LC - (q+1) \times SC$ $= (3.5q+2.5v-2) \times LC + (q+1) \times (LC-SC)$ In the above computation, the computation result takes a positive value since $q \geq 0$, $v \geq 1$ and LC>SC. Accordingly, it is proven that the amount of computation in a computation method of the present invention is smaller than the amount of computation of the Conventional Method 1 or Conventional Method 2.

A difference between the amount of computation of the step A3 of the Conventional Method 3 and the amount of computation of the step A in a computation method of the present invention is computed below.

(amount of computation of Conventional Method 3)−(amount of computation in a computation method of the present invention)

$= (2.5k+2.5v) \times LC - ((q+2) \times LC + (q+1) \times SC)$ $= (2.5k+2.5v-q-2) \times LC - (q+1) \times SC$ $= (2.5k+2.5v-2q-3) \times LC + (q+1) \times (LC-SC)$ In the above computation result, the second term takes a positive value since $q \geq 0$ and LC>SC. Moreover, the coefficient of LC of the fist term in the above computation result can be represented as below since $v \geq 1$.

$2.5k+2.5v-2q-3 \geq 2.5 \times (k-q)+0.5 \times 0.5$

In the above inequality, $q \geq 0$ and q<k are satisfied since it is clear that the number q of successive "0" from most significant digit is smaller than the bit length per 1 word. Accordingly, the above inequality is represented as below and the first term takes a positive value.

$2.5k+2.5v-2q-3 \geq 2.5 \times (k-q)+0.5q-0.5 > 0$

It is proven from the above computation result that the amount of computation in a computation method of the present invention is smaller than the amount of computation of the Conventional Method 3. Accordingly, when the amount of computation involved in the step A1 of the Conventional Method 1, the step A2 of the Conventional Method 2, the step A3 of the Conventional Method 3 and the step A in a computation method of the present invention is compared, it is proven that the amount of computation involved in the step A in a computation method of the present invention has the smallest value and the computation method of the present invention is superior.

Next, considering the amount of computation involved in the step B1 of the Conventional Method 1, the step B2 of the Conventional Method 2, the step B3 and step C3 of the Conventional Method 3 and the step B and step C in a computation method of the present invention, the total amount of computation will be compared using an example. The amount of computation of REDC is changed in a variety of manners depending on conditions. As described above, the computing device 1 of the present invention, which performs an REDC operation by the operation means 14 constituted of a coprocessor, realizes quick computation. Accordingly, comparison of the amount of computation is performed here based on the assumption that the amount of computation of REDC is equal to the amount of computation of LC. Moreover, it is assumed that as small a value as possible is selected as the value of v in the respective examples and computation methods. The reason of selecting the minimum value for v is that the number of LC times and SC times increases in proportion to v while the number of REDC times decreases in proportion to $\log_2 (1/v)$. For example, when the value of v is doubled, the number of LC times and SC times is also doubled while REDC decreases only by 1 time. Moreover, on the condition of LC=REDC, considering also that the sum of the number of LC times and SC times and the number of REDC times directly gives the total amount of computation, it is considered that the total amount of computation has the smallest value when selecting the smallest value of v. It should be noted that, regarding the examples described below, Example 4 corresponds to the above Example 1, Example 5 corresponds to the above Example 2 and Example 6 corresponds to the above Example 3.

Example 4

Application to Computation of RSA Cryptography (1 Word is 32 Bit: k=32) of 1024 Bit When 1 word is 32 bit, 1024 bit is represented by 32 words. Accordingly, k=32 and m=32. Moreover, the number of successive "0" from the most significant digit q=0.

Conventional Method 1.

Since m×k=1024 and the minimum value of v for giving (m×k)/v which has an exponential value of 2 is 1, v=1 is selected.

Step A1.

$(5.5q+2.5v+1) \times LC = 3.5 \times LC$

Step B1.

$$p \times REDC = \log_2((m \times k)/v) \times REDC = 10 \times REDC$$

Sum $$3.5 \times LC + 10 \times REDC = 13.5 \times LC$$

Conventional Method 2.

Since (m×k)/v does not need to have an exponential value of 2, v=1 is selected.

Step A2.

$$(5.5q + 2.5v + 1) \times LC = 3.5 \times LC$$

Step B2.

$$p' - 1 + W((m \times k)/v) \times REDC = (11 - 1 + W((10000000000)_{2,11})) \times REDC = 10 \times REDC$$

Sum $$3.5 \times LC + 10 \times REDC = 13.5 \times LC$$

Conventional Method 3.

Since (m×k)/v does not need to have an exponential value of 2, v=1 is selected.

Step A3.

$$(2.5k + 2.5v) \times LC = 82.5 \times LC$$

Step B3 and Step C3

$$p'' \times REDC = \log_2((m \times k)/v) \times REDC = 10 \times REDC$$

It should be noted that the correction operation is not performed since (m×k)/v takes an exponential value of 2.

Sum $$82.5 \times LC + 10 \times REDC = 92.5 \times LC$$

Computation Method of Present Invention
Step A $$(q+1) \times LC + (q+1) \times SC = LC + SC$$

Step B and Step C $$p \times REDC = \log_2(m \times k) \times REDC = 10 \times REDC$$

It should be noted that the correction operation is not performed since m×k takes an exponential value of 2.

Sum $$LC + SC + 10 \times REDC = 11 \times LC + SC$$

Example 5

Application to Computation of Elliptic Curve Cryptography (1 Word is 8 Bit: k=8) of 163 Bit When 1 word is 8 bit, 163 bit is represented by 21 words. Accordingly, k=8 and m=21. Moreover, the number of successive "0" from the most significant digit q=5.

Conventional Method 1.

Since m×k=168 and the minimum value of v for giving (m×k)/v which has an exponential value of 2 is 21, v=21 is selected.

Step A1.

$$(5.5q + 2.5v + 1) \times LC = (27.5 + 52.5 + 1) \times LC = 81 \times LC$$

Step B1.

$$p \times REDC = \log_2((m \times k)/v) \times REDC = 3 \times REDC$$

Sum $$81 \times LC + 3 \times REDC = 84 \times LC$$

Conventional Method 2.

Since (m×k)/v does not need to have an exponential value of 2, v=1 is selected.

Step A2.

$$(5.5q + 2.5v + 1) \times LC = (27.5 + 2.5 + 1) \times LC = 31 \times LC$$

Step B2.

$$p' - 1 + W((m \times k)/v) \times REDC = (8 - 1 + W((10101000)_{2,8})) \times REDC = 9 \times REDC$$

Sum $$31 \times LC + 9 \times REDC = 40 \times LC$$

Conventional Method 3.

Since (m×k)/v does not need to have an exponential value of 2, v=1 is selected.

Step A3.

$$(2.5k + 2.5v) \times LC = 22.5 \times LC$$

Step B3 and Step C3

$$(p'' + 1) \times REDC = (\log_2((m \times k)/v) + 1) \times REDC = (8 + 1) \times REDC = 9 \times REDC$$

It should be noted that a correction operation is performed since (m×k)/v does not have an exponential value of 2.

Sum $$23.5 \times LC + 9 \times REDC = 32.5 \times LC$$

Computation Method of Present Invention
Step A $$(q+1) \times LC + (q+1) \times SC = 6 \times LC + 6 \times SC$$

Step B and Step C $$(p+1) \times REDC = (\log_2(m \times k) + 1) \times REDC = (8 + 1) \times REDC = 9 \times REDC$$

It should be noted that a correction operation is performed since m×k does not have an exponential value of 2.

Sum $$6 \times LC + 6 \times SC + 9 \times REDC = 15 \times LC + 6 \times SC$$

Example 6

Application to Computation of Elliptic Curve Cryptography (1 Word is 32 Bit: k=32) of 160 Bit When 1 word is 32 bit, 160 bit is represented by 5 words. Accordingly, k=32 and m=5. Moreover, the number of successive "0" from the most significant digit q=0.

Conventional Method 1.

Since m×k=160 and the minimum value of v for giving (m×k)/v which has an exponential value of 2 is 5, v=5 is selected.

Step A1.

$$(5.5q + 2.5v + 1) \times LC = (12.5 + 1) \times LC = 13.5 \times LC$$

Step B1

$$p \times REDC = \log_2((m \times k)/v) \times REDC = 5 \times REDC$$

Sum $$13.5 \times LC + 5 \times REDC = 18.5 \times LC$$

Conventional Method 2.

Since (m×k)/v does not need to have an exponential value of 2, v=1 is selected.

Step A2.

$$(5.5q + 2.5v + 1) \times LC = (2.5 + 1) \times LC = 3.5 \times LC$$

Step B2.

$$p' - 1 + W((m \times k)/v) \times REDC = (8 - 1 + W((10100000)_{2,8})) \times REDC = 8 \times REDC$$

Sum $$3.5 \times LC + 8 \times REDC = 11.5 \times LC$$

Conventional Method 3.

Since (m×k)/v does not need to have an exponential value of 2, v=1 is selected.

Step A3.

$$(2.5k + 2.5v) \times LC = 82.5 \times LC$$

Step B3 and Step C3

$$(p''+1) \times REDC = (\log_2((m \times k)/v) + 1) \times REDC = (8+1) \times REDC = 9 \times REDC$$

It should be noted that a correction operation is performed since (m×k)/v does not have an exponential value of 2.

Sum $$82.5 \times LC + 9 \times REDC = 91.5 \times LC$$

Computation Method of Present Invention

Step A $$(q+1) \times LC + (q+1) \times SC = LC + SC$$

Step B and Step C $$(p+1) \times REDC = (\log_2(m \times k) + 1) \times REDC = (8+1) \times REDC = 9 \times REDC$$

It should be noted that a correction operation is performed since m×k does not have an exponential value of 2.

Sum $$LC + SC + 9 \times REDC = 10 \times LC + SC$$

FIG. 22 is a chart showing the number of operation times necessary for a computation method of the present invention and a computation method of a Montgomery conversion parameter in conventional methods. FIG. 22 is a chart showing the result shown as Example 4 to Example 6 all together. As is clear from FIG. 22, a computation method of the present invention is superior to the Conventional Method 1 to Conventional Method 3 on any of the conditions shown as Example 4 to Example 6.

Although a form of applying a computing device to an operation card was described in the above embodiment, the present invention is not limited to this and may be applied to a variety of forms, such as a form of applying a computing device to a computer body such as a personal computer or a server computer.

Moreover, although a form of implementing a coprocessor for executing an REDC operation was described in the above embodiment, the present invention is not limited to this and may be applied to a variety of forms, such as executing an REDC operation by a software process.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computation method for computing a value relating to a Montgomery conversion parameter, which is used in a Montgomery multiplication remainder operation and is a remainder value relating to a divisor n of a remainder, using a register, which has at least m words that have a bit length k per 1 word and an operation unit for executing a Montgomery multiplication remainder operation REDC (A, B)$_n$, which is defined as $2^{-m*k} \times A \times B$ (mod n), for values A and B and a divisor n of a remainder having a significant word length m, comprising:

storing a negative number of a divisor n of a remainder in the register;

carrying out a shift process of performing one-bit shift of a value stored in the register in a carry direction;

judging whether a most significant bit which overflows the register becomes 0 or 1;

repeating the shift process until it is judged that the most significant bit becomes 0;

repeating a process of executing a Montgomery multiplication remainder operation REDC (REG, REG)$_n$ for a value REG, which is stored in the register on which the shift process has been repeated until said judging finds the most significant bit becomes 0, by the operation unit and storing a result thereof in the register, p times which p is an integer that satisfies $2^{p-1} < m \times k \leq 2^p$;

executing a Montgomery multiplication remainder operation REDC (REG, g)$_n$ for a value REG stored in the register by the operation unit and storing a result thereof in the register when $2^p > m \times k$ (here, $g = 2^{k*G(p,m,k)}$ and $G(p, m, k) = 2 \times m - 2^p/k$); and outputting a value stored in the register as an equivalence which gives the same remainder value relating to a divisor n as a Montgomery conversion parameter.

2. A computing device for computing a value relating to a Montgomery conversion parameter, which is used in a Montgomery multiplication remainder operation and is a remainder value relating to a divisor n of a remainder, comprising:

a register which has at least m words that have a bit length k per 1 word;

an operation unit for executing a Montgomery multiplication remainder operation REDC (A, B)$_n$, which is defined as $2^{-m*k} \times A \times B$ (mod n), for values A and B and a divisor n of a remainder having a significant word length m; and a controller capable of performing operations of:

storing a negative number of a divisor n of a remainder in the register;

carrying out a shift process of performing one-bit shift of a value stored in the register in a carry direction;

judging whether a most significant bit which overflows the register becomes 0 or 1;

repeating the shift process until it is judged that the most significant bit becomes 0;

repeating a process of executing a Montgomery multiplication remainder operation REDC (REG, REG)$_n$ for a value REG, which is stored in the register on which the shift process has been repeated until said judging finds the most significant bit becomes 0, by the operation unit and storing a result thereof in the register, p times which p is an integer that satisfies $2^{p-1} < m \times k \leq 2^p$;

executing a Montgomery multiplication remainder operation REDC (REG, g)$_n$ for a value REG stored in the register by the operation unit and storing a result thereof in the register when $2^p > m \times k$ (here, $g = 2^{k*G(p,m,k)}$ and $G(p, m, k) = 2 \times m - 2^p/k$); and outputting a value stored in the register as an equivalence which gives the same remainder value relating to a divisor n as a Montgomery conversion parameter.

3. The computing device according to claim 2, wherein another register is provided, and the controller is further capable of performing operations of:

storing n in a first register which has m words and 0 in a second register which has m or more words; and subtracting a value stored in the first register from a value stored in the second register to compute a negative number of a divisor n of a remainder.

4. The computing device according to claim 3, wherein the shift process is an addition process of adding a value stored in the register to said value, and
a most significant bit which overflows the register in the shift process is detected as a carry value which is generated by the addition process.

5. The computing device according to claim 2, wherein the controller is further capable of performing operations of:
storing a divisor n of a remainder in the register; and
computing a complement of a value stored in the register as a negative number of a divisor n of a remainder.

6. The computing device according to claim 5, wherein the shift process is an addition process of adding a value stored in the register to said value, and
a most significant bit which overflows the register in the shift process is detected as a carry value which is generated by the addition process.

7. The computing device according to claim 2, wherein the controller is further capable of performing operations of:
storing a divisor n of a remainder in the register;
inverting a value stored in the register; and
computing a negative number of a divisor n of a remainder assuming that a least significant bit of a value stored in the register is 1.

8. The computing device according to claim 7, wherein the shift process is an addition process of adding a value stored in the register to said value, and
a most significant bit which overflows the register in the shift process is detected as a carry value which is generated by the addition process.

9. The computing device according to claim 2, wherein the shift process is an addition process of adding a value stored in the register to said value, and
a most significant bit which overflows the register in the shift process is detected as a carry value which is generated by the addition process.

10. A non-transitory recording medium for recording a computer program for causing a computer, which comprises a register that has at least m words having a bit length k per 1 word and an operation unit for executing a Montgomery multiplication remainder operation REDC (A, B)n that is defined as $2-rn*k \times A \times B \pmod{n}$ for values A and B and a divisor n of a remainder having a significant word length m, to compute a value relating to a Montgomery conversion parameter, which is used in a Montgomery multiplication remainder operation and is a remainder value relating to a divisor n of a remainder, said computer program comprising: causing the computer to store a negative number of a divisor n of a remainder in the register; causing the computer to carry out a shift process of performing one-bit shift of a value stored in the register in a carry direction, judge whether a most significant bit which overflows the register becomes 0 or 1 and repeat the shift process until it is judged that the most significant bit becomes 0; causing the computer to repeat a process of executing a Montgomery multiplication remainder operation REDC (REG, REG)n for a value REG, which is stored in the register on which the shift process has been repeated until said judging finds the most significant bit becomes 0, by the operation unit and storing a result thereof in the register, p times which p is an integer that satisfies $2p-1\ m \times k\_2n$; causing the computer to execute a Montgomery multiplication remainder operation REDC (REG, g)n for a value REG stored in the register by the operation unit and store a result thereof in the register when $2p > m \times k$ (here, g—2k~G(p, m, k) and G(p, m, k)—$2 \times m - 2p/k$); and causing the computer to output a value stored in the register as an equivalence which gives the same remainder value relating to a divisor n as a Montgomery conversion parameter.

* * * * *

UNITED STATES PATENT AND TRADEMARK OFFICE
CERTIFICATE OF CORRECTION

PATENT NO. : 8,085,931 B2
APPLICATION NO. : 11/192138
DATED : December 27, 2011
INVENTOR(S) : Kouichi Itoh et al.

It is certified that error appears in the above-identified patent and that said Letters Patent is hereby corrected as shown below:

Column 32, Line 9, in Claim 10, delete "2-rn*k×A×B" and insert -- $2^{-m \cdot k} \times A \times B$ --, therefor.

Column 32, Line 27, in Claim 10, delete "2p-1 m×k_2n;" and insert -- $2^{p-1} < m \times k \leq 2^p$ --, therefor.

Column 32, Line 31-32, in Claim 10, delete "2p>m×k (here, g—2k~G(p, m, k) and G(p, m, k)—2×m-2p/k);" and insert -- $2^p$ > m×k (here, g = 2k*G(p, m, k) and G(p, m, k) = 2×m-2p/k); --, therefor.

Signed and Sealed this
Twenty-seventh Day of March, 2012

David J. Kappos
*Director of the United States Patent and Trademark Office*